(12) United States Patent
Satpathy et al.

(10) Patent No.: US 9,965,248 B2
(45) Date of Patent: *May 8, 2018

(54) THRESHOLD FILTERING OF COMPRESSED DOMAIN DATA USING STEERING VECTOR

(71) Applicant: Intel Corporation, Santa Clara, CA (US)

(72) Inventors: Sudhir K. Satpathy, Hillsboro, OR (US); Sanu K. Mathew, Hillsboro, OR (US); Ram K. Krishnamurthy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/296,139

(22) Filed: Oct. 18, 2016

(65) Prior Publication Data

US 2017/0039034 A1 Feb. 9, 2017

Related U.S. Application Data

(63) Continuation of application No. 14/607,113, filed on Jan. 28, 2015, now Pat. No. 9,503,747.

(51) Int. Cl.
| | |
|---|---|
| *G06F 7/544* | (2006.01) |
| *H04N 19/48* | (2014.01) |
| *G06F 7/533* | (2006.01) |
| *G06F 7/24* | (2006.01) |
| *H04N 19/85* | (2014.01) |
| *G06T 7/00* | (2017.01) |
| *G06T 7/73* | (2017.01) |

(52) U.S. Cl.
CPC ............ *G06F 7/533* (2013.01); *G06F 7/24* (2013.01); *G06F 7/5443* (2013.01); *G06T 7/74* (2017.01); *G06T 7/97* (2017.01); *H04N 19/48* (2014.11); *H04N 19/85* (2014.11)

(58) Field of Classification Search
CPC .......... H04N 19/48; H04N 19/85; G06F 7/24; G06F 7/5443
USPC ......................................... 382/235; 708/603
See application file for complete search history.

(56) References Cited

U.S. PATENT DOCUMENTS

| | | | |
|---|---|---|---|
| 5,053,974 A | 10/1991 | Penz | |
| 5,774,838 A | 6/1998 | Miseki | |
| 6,307,968 B1 * | 10/2001 | Liguori | ................... G06T 9/007 |
| | | | 382/235 |
| 7,260,488 B2 * | 8/2007 | Abe | ..................... G06K 9/6232 |
| | | | 382/219 |

(Continued)

*Primary Examiner* — Yubin Hung
(74) *Attorney, Agent, or Firm* — Trop, Pruner & Hu, P.C.

(57) ABSTRACT

In an embodiment, a processor includes a compression domain threshold filter coupled to a plurality of cores. The compression domain threshold filter is to: receive a sample vector of compressed data to be filtered; calculate, based at least on a first subset of the elements of the sample vector, an estimated upper bound value of a dot product of the sample vector and a steering vector; determine whether the estimated upper bound value of the dot product satisfies a filter threshold value; and in response to a determination that the estimated upper bound value of the dot product does not satisfy the filter threshold value, discard the sample vector without completion of a calculation of the dot product of the sample vector and the steering vector. Other embodiments are described and claimed.

14 Claims, 22 Drawing Sheets

(56) References Cited

U.S. PATENT DOCUMENTS

| | | |
|---|---|---|
| 2001/0000221 A1 | 4/2001 | Chen et al. |
| 2002/0009064 A1 | 1/2002 | Blessent et al. |
| 2002/0178158 A1 | 11/2002 | Kanno |
| 2002/0186750 A1 | 12/2002 | Callaway, Jr. et al. |
| 2003/0152270 A1* | 8/2003 | Saiga .................. H04N 1/4115 382/190 |
| 2003/0204499 A1 | 10/2003 | Shahabi et al. |
| 2004/0230632 A1* | 11/2004 | Buchert ................ G06F 5/015 708/622 |
| 2013/0204883 A1 | 8/2013 | Zheng et al. |
| 2015/0131848 A1 | 5/2015 | Thirualeshwara et al. |
| 2016/0188533 A1* | 6/2016 | Kaul .................. G06F 15/8092 712/2 |

* cited by examiner

THRESHOLD FILTERING OF COMPRESSED DOMAIN DATA USING STEERING VECTOR

This application is a continuation of U.S. patent application Ser. No. 14/607,113, filed Jan. 28, 2015, the content of which is hereby incorporated by reference.

STATEMENT OF GOVERNMENT INTEREST

This invention was made with Government support under contract number FA8650-13-3-7338 awarded by the Department of Defense. The Government has certain rights in this invention.

FIELD OF INVENTION

Embodiments relate generally to processing of compressed domain data. More particularly, embodiments are related to threshold filtering of compressed domain data.

BACKGROUND

Advances in computing and networking have been associated with the use of compression technologies to reduce the size of data. For example, internet services may utilize compression techniques to decrease the bandwidth required for network traffic. Further, computing devices may utilize compression to reduce the amount of storage space required to store data.

DETAILED DESCRIPTION

Some computing systems involve processing of compressed domain data. In such systems, it may be useful to only process compressed data elements that include a sufficient amount of desired information. For example, an automated security system may analyze compressed video images from a surveillance camera to determine whether the images show any movements or changes. If a particular image includes information indicating a change, the security system may perform further analysis on that image to identify any suspicious activity (e.g., a trespasser within a secured area).

In accordance with some embodiments, a filtering accelerator may provide threshold filtering of a compressed data sample. The filtering accelerator may use a steering vector to filter an unnecessary compressed data sample without performing a complete evaluation of the sample. Further, the filtering accelerator may provide sorting of the steering vector. In addition, the filtering accelerator may calculate a covariance matrix for use in updating the steering vector. In some embodiments, the filtering accelerator may reduce the power, time, and/or hardware required to perform filtering of the compressed data.

Although the following embodiments are described with reference to particular implementations, embodiments are not limited in this regard. In particular, it is contemplated that similar techniques and teachings of embodiments described herein may be applied to other types of circuits, semiconductor devices, processors, systems, etc. For example, the disclosed embodiments may be implemented in any type of computer system, including server computers (e.g., tower, rack, blade, micro-server and so forth), communications systems, storage systems, desktop computers of any configuration, laptop, notebook, and tablet computers (including 2:1 tablets, phablets and so forth).

In addition, disclosed embodiments can also be used in other devices, such as handheld devices, systems on chip (SoCs), and embedded applications. Some examples of handheld devices include cellular phones such as smartphones, Internet protocol devices, digital cameras, personal digital assistants (PDAs), and handheld PCs. Embedded applications may typically include a microcontroller, a digital signal processor (DSP), network computers (NetPC), set-top boxes, network hubs, wide area network (WAN) switches, wearable devices, or any other system that can perform the functions and operations taught below. Further, embodiments may be implemented in mobile terminals having standard voice functionality such as mobile phones, smartphones and phablets, and/or in non-mobile terminals without a standard wireless voice function communication capability, such as many wearables, tablets, notebooks, desktops, micro-servers, servers and so forth.

Figure 1A:
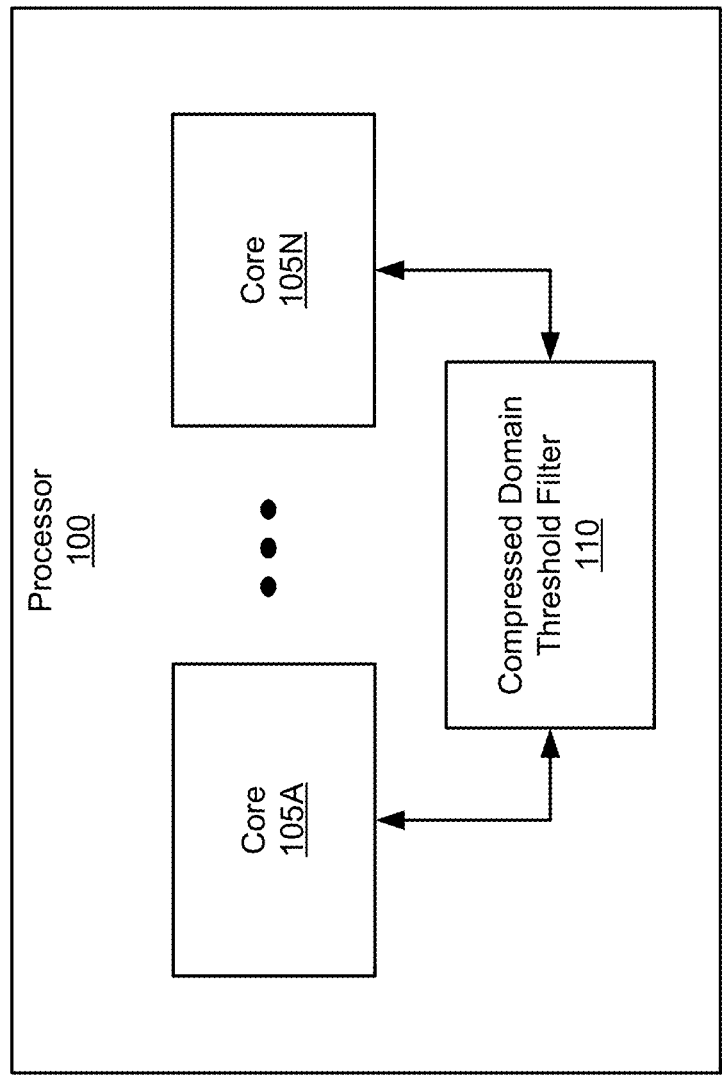
FIG. 1A is a block diagram of an example processor in accordance with one or more embodiments.

Referring now to FIG. 1A, shown is a block diagram of an example processor 100 in accordance with one or more embodiments. In some embodiments, the processor 100 may be included in an electronic device or component. For example, the processor 100 may be included in a cellular telephone, a computer, a server, a network device, a system on a chip (SoC), a controller, a wireless transceiver, a power supply unit, etc. The processor 100 may be a general purpose hardware processor (e.g., a central processing unit (CPU)). In some embodiments, the processor 100 may be coupled to any type of computer memory (not shown), including dynamic random access memory (DRAM), static random-access memory (SRAM), non-volatile memory (NVM), a combination of DRAM and NVM, etc.

In some embodiments, the processor 100 may include a compressed domain threshold filter 110 and any number of processing cores 105A-105N. Each of the cores 105A-105N may be a general purpose hardware processing core. As shown, the compressed domain threshold filter 110 may be coupled to one or more of the cores 105A-105N.

In some embodiments, the compressed domain threshold filter 110 may be used to filter compressed data samples that fail to satisfy a filter threshold. As used herein, "satisfying" a filter threshold refers generally to evaluating the sample using a particular level of a desired data property or quality. Note that, depending on the current use of the compressed domain threshold filter 110, the threshold may be a minimum level or a maximum level. For example, samples that satisfy a threshold may include samples with values below the threshold, samples with values above the threshold, samples with values equal to the threshold, and so forth. In one or more embodiments, the compressed domain threshold filter 110 may receive compressed data samples provided from a compressed domain sensor (e.g., sound sensor, image/video sensor, temperature sensor, motion sensor, pressure sensor, etc.)

In some embodiments, any samples that are not filtered by the compressed domain threshold filter 110 may be considered to be sufficiently useful, and may be provided to a consumer application or process. For example, any unfiltered data samples may be provided to a compressed data application executed by one or more of the cores 105A-105N, may be provided to a different computer or network location, and so forth. Such compressed data applications may include, e.g., depth estimation, classification, object recognition, inference/learning analysis, etc.

Figure 1B:
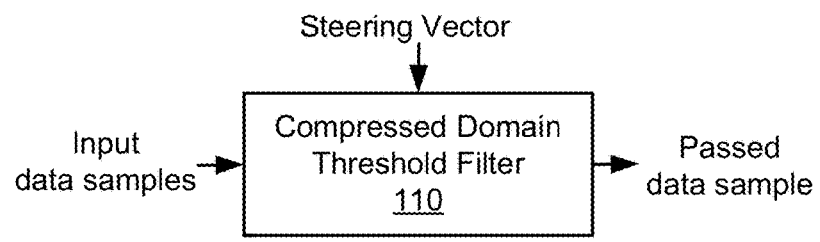
FIG. 1B is a schematic of the compressed domain threshold filter 110 in accordance with one or more embodiments.
Figure 1C:
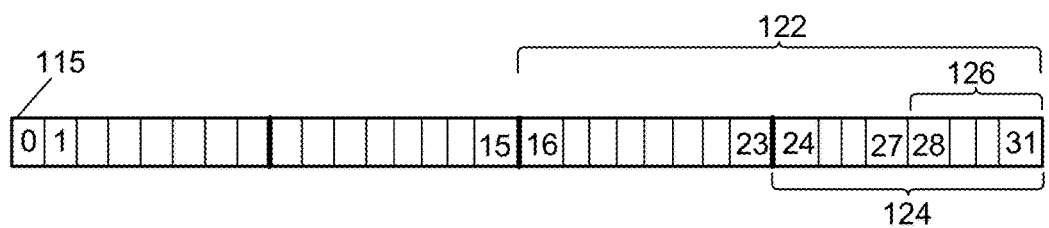
FIG. 1C is an example of a sample vector in accordance with one or more embodiments.

Referring now to FIG. 1B, shown is a schematic of the compressed domain threshold filter 110 in accordance with one or more embodiments. The compressed domain threshold filter 110 may be a hardware unit dedicated to operations related to filtering compressed domain data. The compressed domain threshold filter 110 receives input data samples to be filtered. Each input data sample may be referred to as a "sample vector," and may include multiple elements of compressed domain data (e.g., compressed video images, compressed audio data, compressed measurements, and so forth). FIG. 1C shows an illustration of an example of a compressed data sample vector 115 in accordance with one or more embodiments. As shown, in the example of FIG. 1C, the sample vector 115 includes thirty-two elements (numbered i=0 to 31). Note that some element numbers of the sample vector 115 are not shown in FIG. 1C for the sake of clarity.

Figure 1D:
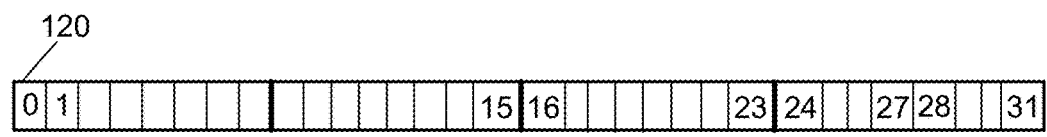
FIG. 1D is an example of a steering vector in accordance with one or more embodiments.

Referring again to FIG. 1B, the compressed domain threshold filter 110 may receive a steering vector including multiple data elements. The number of elements in the steering vector may be equal to the number of elements in each sample vector. FIG. 1D shows an illustration of an example of a steering vector 120 in accordance with one or more embodiments. As shown, in the example of FIG. 1D, the steering vector 120 also includes thirty-two elements (numbered i=0 to 31). Note that some element numbers of the steering vector 120 are not shown in FIG. 1D for the sake of clarity. In one or more embodiments, each element i of the steering vector 120 may be uniquely associated with a corresponding element i the sample vector 115. The elements of the steering vector 120 may be used to subdue background information and simultaneously amplify information of interest in the corresponding elements of the sample vector 115. For example, the first element i=0 of the steering vector 120 may be a value used to extract useful information from the corresponding element i=0 of the sample vector 115.

In some embodiments, the compressed domain threshold filter 110 may sort the elements of the steering vector 120 in order of decreasing value. For example, after sorting, the first element may have the largest value of all elements of the steering vector 120. Further, the last element may have the smallest value of all elements of the steering vector 120. In some embodiments, after the steering vector 120 is sorted, the elements of the sample vector 115 are read in the corresponding order to match the sorted steering vector 120.

Referring again to FIG. 1B, the compressed domain threshold filter 110 may perform a dot product of the steering vector and each sample vector. The dot product may be calculated as the sum of the products of the corresponding elements of the steering vector and the sample vector. For example, the following formula corresponds to the dot product X·Y of a steering vector X and a sample vector Y, with both X and Y having elements i from 0 to n:

$$X \cdot Y = x_0 y_0 + x_1 y_1 + \ldots + x_n y_n$$

In some embodiments, the compressed domain threshold filter 110 may perform the dot product calculation by iterating through each element i from 0 to n to compute each product $x_i y_i$, and may sum all of the products $x_i y_i$ to obtain the dot product X·Y. The compressed domain threshold filter 110 may then determine whether the dot product of the sample vector and the steering vector satisfies a defined filter threshold level T. If the dot product for a particular sample vector satisfies the filter threshold T, the compressed domain threshold filter 110 passes the sample vector for further downstream processing (shown in FIG. 1B as "passed data sample"). However, if the dot product for a sample vector does not satisfy the threshold level T, the compressed domain threshold filter 110 can filter (e.g., discard or drop) the sample vector.

In some embodiments, the compressed domain threshold filter 110 may estimate an upper bound value of the dot product without completing the full calculation of the dot product X·Y. For example, during an iteration through elements i=0 to n to calculate a dot product X·Y, the compressed domain threshold filter 110 may reach at least one element specified as a checkpoint. The checkpoint element may be associated with a subset of the elements of the sample vector. This subset of the elements may be used to calculate a first portion of the dot product. The first portion of the dot product may be combined with a maximum value of the remaining portion of the dot product to determine an estimate of the upper bound value of the dot product X·Y.

An example of a calculation of the upper bound value is described with reference to FIGS. 1C-1D. Assume that element i=15 of the steering vector 120 is specified as checkpoint elements. Thus, in this example, the compressed domain threshold filter 110 iterates through elements from 0 to 15 to calculate a first portion A of the dot product X·Y. The calculation of the first portion A associated with checkpoint element i=15 is shown by the following formula:

$$A_{15}=(x_0y_0+x_1y_1+\ldots+x_{15}y_{15}).$$

In response to reaching the checkpoint element i=15, the compressed domain threshold filter 110 may estimate a remaining portion B of the dot product as the maximum value of the dot product for the remaining sixteen elements (i.e., elements i=16 to 31). In some embodiments, the estimated remaining portion B may be based in part on a maximum remaining sample element $y_{m16}$, which is the element of the set 122 of remaining sample elements (i.e., $y_{16}$ to $y_{31}$) that is determined to have a maximum value. Further, in some embodiments, the estimated remaining portion B may be based in part on the next steering vector element $x_{16}$ in the sequence. Note that, because the steering vector 120 is sorted in order of decreasing value, the next element $x_{16}$ of the steering vector 120 has a larger value than the remaining elements of the steering vector 120. Furthermore, the estimated remaining portion B may be based in part on the number of remaining elements (i.e., sixteen).

In one or more embodiments, the estimated remaining portion B may be calculated by multiplying the maximum remaining sample element $y_{m16}$ times the next steering vector element $x_{16}$, and then multiplying the product times the number of remaining elements. In some embodiments, this calculation may provide an estimate of the maximum possible value of the remaining portion of the dot product calculation. This calculation of the estimated remaining portion B associated with checkpoint element i=15 is shown by the following formula:

$$B_{15}=16(y_{m16})(x_{16}).$$

In some embodiments, the compressed domain threshold filter 110 may estimate the upper bound UB of the dot product by summing the first portion of the dot product with the estimated remaining portion B. This calculation of the upper bound UB of the dot product associated with checkpoint element i=15 is shown by the following formula:

$$UB_{15}=(x_0y_0+x_1y_1+\ldots+x_{15}y_{15})+16(y_{m16})(x_{16}).$$

In some embodiments, the compressed domain threshold filter 110 may estimate an upper bound value for multiple checkpoints. For example, assume that, in addition to element i=15, element i=23 is also specified as a checkpoint element. Assume also that maximum remaining sample element $y_{m24}$ is the element with the largest value of the set 124 of remaining sample elements (i.e., $y_{24}$ to $y_{31}$). Thus, in this example, the compressed domain threshold filter 110 may estimate the upper bound UB of the dot product associated with checkpoint element i=23 using the following formula:

$$UB_{23}=(x_0y_0+x_1y_1+\ldots+x_{23}y_{23})+8(y_{m24})(x_{24}).$$

In another example, assume that, in addition to elements i=15 and i=23, element i=27 is also specified as a checkpoint element. Assume also that maximum remaining sample element $y_{m28}$ is the element with the largest value of the set 126 of remaining sample elements (i.e., $y_{28}$ to $y_{31}$). Thus, in this example, the compressed domain threshold filter 110 may estimate the upper bound UB of the dot product associated with checkpoint element i=27 using the following formula:

$$UB_{27}=(x_0y_0+x_1y_1+\ldots+x_{27}y_{27})+4(y_{m28})(x_{28}).$$

In some embodiments, the compressed domain threshold filter 110 may use the estimated upper bound UB to determine whether to filter the sample vector. For example, the compressed domain threshold filter 110 may determine whether the estimated upper bound UB satisfies the defined filter threshold level T, and if not, may filter or otherwise discard the sample vector. Note that, when the sample vector is filtered using the estimated upper bound UB, the compressed domain threshold filter 110 does not need to perform any remaining portion of the calculation of the dot product X·Y. For example, if $UB_{15}$ is less than the filter threshold T, the compressed domain threshold filter 110 does not have to perform the remaining calculations of the dot product, namely $(x_{16}y_{16}+x_{17}y_{17}+\ldots+x_{31}y_{31})$. In another example, if $UB_{23}$ is less than the filter threshold T, the compressed domain threshold filter 110 does not have to perform the remaining calculations of the dot product, namely $(x_{24}y_{24}+x_{25}y_{25}+\ldots+x_{31}y_{31})$. Thus, because the compressed domain threshold filter 110 can filter some sample vectors at multiple checkpoints without performing the full dot product calculation, the power and/or time required to filter the compressed data samples may be reduced in some embodiments.

In some embodiments, the number of checkpoints used by the compressed domain threshold filter 110 may be based on the length of the sample vector 115 and/or the steering vector 120. For example, in the case that the sample vector 115 and/or the steering vector 120 includes less than thirty-two elements, the compressed domain threshold filter 110 may use two or fewer checkpoint elements. In another example, in the case that the sample vector 115 and/or the steering vector 120 includes more than thirty-two elements, the compressed domain threshold filter 110 may use four or more checkpoint elements. In some embodiments, each checkpoint may be associated with an n power of two number of remaining bits in a vector (e.g., 4, 8, 16, 32, and so forth).

Figure 1E:
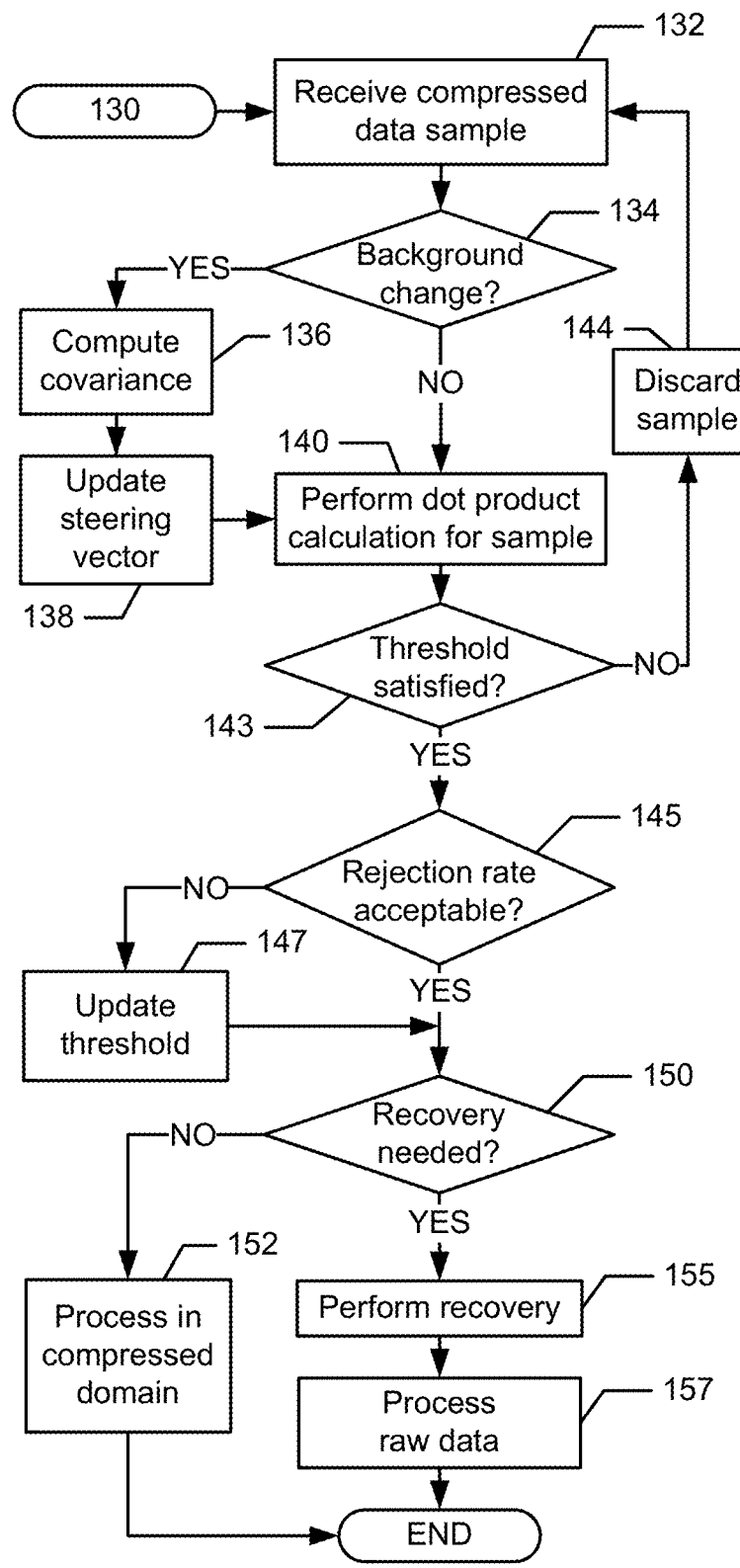
FIG. 1E is a sequence in accordance with one or more embodiments.

Referring now to FIG. 1E, shown is a sequence 130 in accordance with one or more embodiments. In some embodiments, all or a part of the sequence 130 may be implemented by the compressed domain threshold filter 110 shown in FIGS. 1A-1B. In some embodiments, some or all of the sequence 130 may be implemented in hardware, software, and/or firmware. In firmware and software embodiments it may be implemented by computer executed instructions stored in a non-transitory machine readable medium, such as an optical, semiconductor, or magnetic storage device. The machine readable medium may store data, which if used by at least one machine, causes the at least one machine to fabricate at least one integrated circuit to perform a method. For the sake of illustration, the steps involved in the sequence 130 may be described below with reference to FIGS. 1A-1D, which show examples in accordance with some embodiments. However, the scope of the various embodiments discussed herein is not limited in this regard.

At block 132, a threshold filter may receive a compressed data sample to be filtered. For example, referring to FIG. 1B, the compressed domain threshold filter 110 receives input data samples of compressed domain data to be filtered. In some embodiments, the received data sample may be the sample vector 120 shown in FIG. 1D.

At block 134, a determination is made about whether a change in background information has occurred in the compressed data. For example, referring to FIG. 1A, one or more of the cores 105A-105N and/or the compressed domain threshold filter 110 may analyze the compressed data samples to determine whether background information has changed to a greater degree than allowed by a specified tolerance or threshold.

If it is determined at block 134 that a change in background information has not occurred in the compressed data, then at block the sequence continues at block 140 (described below). However, if it is determined at block 134 that a change in background information has occurred in the compressed data, then at block 136, a covariance matrix may be computed. At block 138, the covariance matrix may be used to update the steering vector. For example, referring to FIG. 1A, one or more of the cores 105A-105N and/or the compressed domain threshold filter 110 may update or generate a steering vector using the covariance matrix. Further, the compressed domain threshold filter 110 may sort the elements of the steering vector in order of decreasing value.

At block 140, a dot product calculation may be performed to obtain a calculated value for the data sample. For example, referring to FIG. 1B, the compressed domain threshold filter 110 may calculate a dot product X·Y using all elements of a sample vector and a steering vector. In another example, the compressed domain threshold filter 110 may calculate a portion of the dot product using a subset of elements of the steering vector and the sample vector, and may estimate an upper bound value UB of the dot product based on the portion of the dot product.

At block 143, a determination is made about whether the calculated value for the data sample satisfies the filter threshold. For example, referring to FIG. 1B, the compressed domain threshold filter 110 may determine whether the dot product X·Y of the sample vector and the steering vector meets or exceeds the filter threshold T. In another example, the compressed domain threshold filter 110 may determine whether the estimated upper bound value UB of the dot product satisfies the filter threshold T.

If it is determined at block 143 that the calculated value for the data sample does not satisfy the filter threshold, then at block 144, the current data sample is discarded, and the sequence returns to block 132 to receive a new compressed data sample. However, if it is determined at block 143 that the calculated value for the data sample satisfies the filter threshold, then at block 145, a determination is made about whether the rejection rate is within an acceptable range. For example, referring to FIG. 1A, one or more of the cores 105A-105N and/or the compressed domain threshold filter 110 may determine whether the rate at which the compressed domain threshold filter 110 is filtering the data samples is either too low or too high, and is thus outside an acceptable filtering range.

If it is determined at block 145 that the rejection rate is within an acceptable range, then the sequence continues at block 150 (described below). However, if it is determined at block 145 that the rejection rate is not within an acceptable range, then at block 147, the defined threshold level is updated. For example, referring to FIG. 1A, one or more of the cores 105A-105N and/or the compressed domain threshold filter 110 may determine that the rejection rate is too low, and may thus increase the threshold level. In another example, one or more of the cores 105A-105N and/or the compressed domain threshold filter 110 may determine that the rejection rate is too high, and may thus lower the threshold level. Further, in some embodiments, when the rejection rate is too high, the voltage and/or clock frequency supplied to the domain threshold filter 110 may be decreased, thereby reducing the rejection rate and also conserving power.

At block 150, a determination is made about whether recovery of the compressed data sample is needed. For example, referring to FIG. 1A, one or more of the cores 105A-105N and/or the compressed domain threshold filter 110 may determine whether the compressed data sample is required to undergo a recovery process before it is sent to a downstream process or application.

If it is determined at block 150 that recovery of the compressed data sample is not needed, then at block 152, the data sample may be processed in the compressed domain. For example, referring to FIG. 1A, one or more of the cores 105A-105N may execute an application that receives and uses the compressed data sample. However, if it is determined at block 150 that recovery of the compressed data sample is needed, then at block 155, a recovery operation may be performed to obtain raw or uncompressed data. At block 157, the raw data may be processed. For example, referring to FIG. 1A, one or more of the cores 105A-105N may execute an application that performs a recovery operation (e.g., sparse recovery) of the compressed data sample. The application (or another application) may then process the recovered uncompressed data. After either block 152 or block 157, the sequence 130 is completed.

Figure 1F:
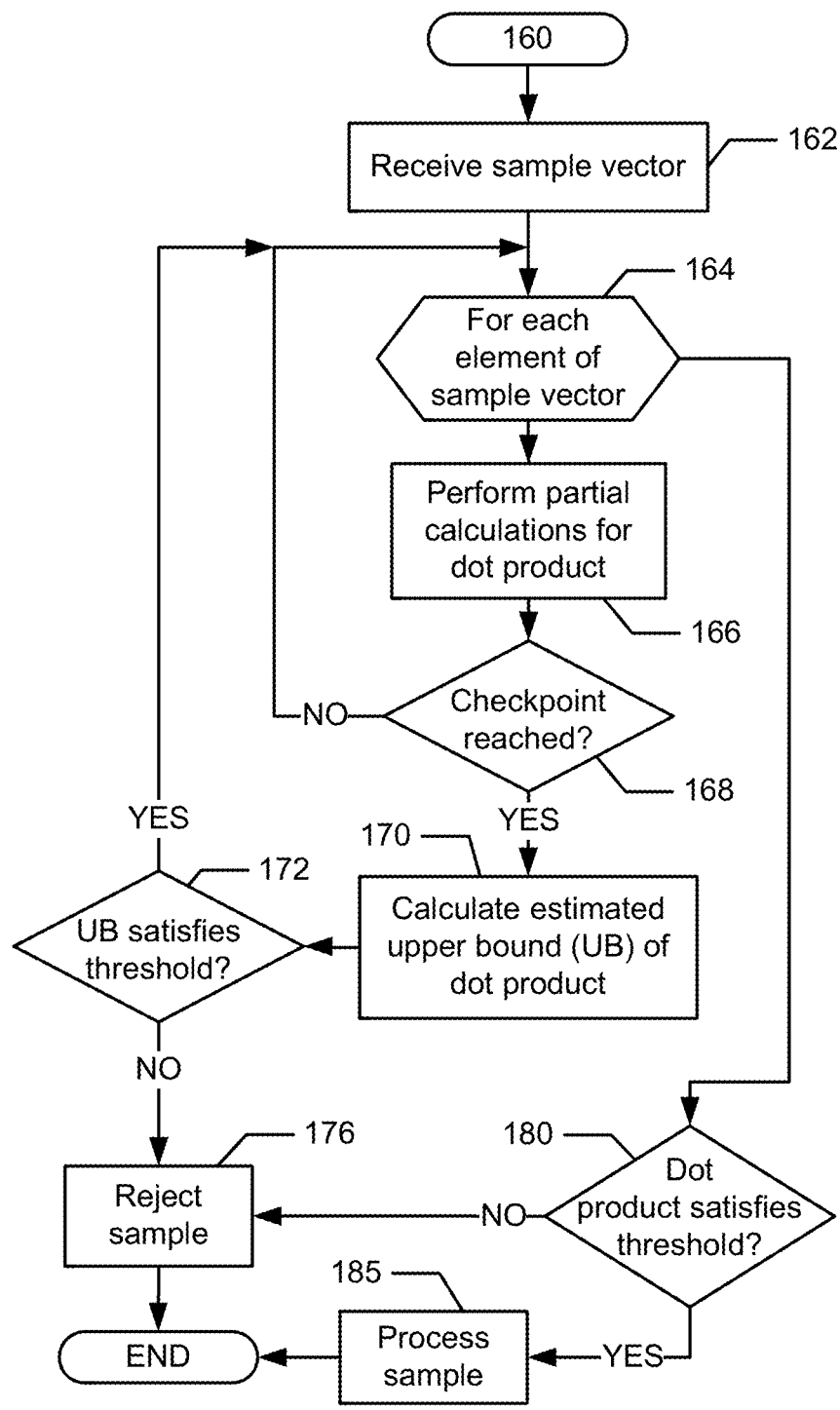
FIG. 1F is a sequence in accordance with one or more embodiments.

Referring now to FIG. 1F, shown is a sequence 160 in accordance with one or more embodiments. In some embodiments, all or a part of the sequence 160 may be implemented by the compressed domain threshold filter 110 shown in FIGS. 1A-1B. In some embodiments, some or all of the sequence 160 may be implemented in hardware, software, and/or firmware. In firmware and software embodiments it may be implemented by computer executed instructions stored in a non-transitory machine readable medium, such as an optical, semiconductor, or magnetic storage device. The machine readable medium may store data, which if used by at least one machine, causes the at least one machine to fabricate at least one integrated circuit to perform a method. For the sake of illustration, the steps involved in the sequence 160 may be described below with reference to FIGS. 1A-1D, which show examples in accordance with some embodiments. However, the scope of the various embodiments discussed herein is not limited in this regard.

At block 162, a threshold filter may receive a sample vector of compressed data. For example, referring to FIG. 1B, the compressed domain threshold filter 110 receives input data samples of compressed domain data to be filtered. The received data sample may be, e.g., the sample vector 120 shown in FIG. 1D.

At block 164, a loop (defined by blocks 164, 166, 168, 170, and 172) may be entered to process each element i included in a dot product calculation. For example, referring to FIGS. 1B-1C, the compressed domain threshold filter 110 may iterate through elements i=0 to 31 to calculate a dot product X·Y of the sample vector 115 and the sorted steering vector 120.

At block 166, partial calculations for a dot product are performed for each element i. For example, referring to FIG. 1B, the compressed domain threshold filter 110 may multiply a value $x_i$ of the steering vector times a value $y_i$ of the sample vector to obtain a product $P_i$, and may sum the products $P_i$ to obtain a first portion of the dot product.

At block 168, a determination is made about whether a checkpoint element has been reached in the steering vector and/or the sample vector. For example, referring to FIGS. 1B-1D, the compressed domain threshold filter 110 may determine that the processing of the steering vector 120 has reached element i=15, which is defined as a checkpoint element.

If it is determined at block 168 that a checkpoint element has not been reached, then the sequence returns to block 164 to process a new element i. However, if it is determined at block 168 that a checkpoint element has been reached, then at block 170, an estimated upper bound (UB) of the dot product may be calculated. For example, referring to FIGS. 1B-1D, the compressed domain threshold filter 110 may calculate a first portion of the dot product using a subset of elements of the steering vector and the sample vector (e.g., elements i=0 to 15). Further, the compressed domain threshold filter 110 may calculate a second portion of the dot product by multiplying the maximum remaining sample element times the next steering vector element, and then multiplying the product times the number of remaining elements. In some embodiments, this second portion may provide an estimate of the maximum possible value of the remaining portion of the dot product calculation. Furthermore, the compressed domain threshold filter 110 may calculate an estimated upper bound UB of the dot product by based on the first portion and/or the second portion of the dot product. For example, the upper bound UB may be calculated by summing the first and second portions of the dot product.

At block 172, a determination is made about whether the estimated upper bound UB of the dot product satisfies a filter threshold value. For example, referring to FIG. 1B, the compressed domain threshold filter 110 may determine whether the upper bound UB meets or exceeds the filter threshold value T.

If it is determined at block 172 that the estimated upper bound UB of the dot product satisfies the filter threshold value, then the sequence returns to block 164 to process a new element i. However, if it is determined at block 172 that the estimated upper bound UB of the dot product does no satisfy the filter threshold value, then at block 176, the current sample is rejected. For example, referring to FIG. 1B, the compressed domain threshold filter 110 may filter or drop the current sample vector. Note that, when a sample is rejected based on a determination that the estimated upper bound UB of the dot product does no satisfy the filter threshold value, the sample is filtered without performing a full dot product calculation.

Once all elements i in the sample vector have been processed at block 164 (i.e., the calculation of dot product X·Y is completed), the sequence 160 continues at block 180, where a determination is made about whether the dot product satisfies the filter threshold. For example, referring to FIG. 1B, the compressed domain threshold filter 110 may determine whether the dot product X·Y of the sample vector and the steering vector meets or exceeds the filter threshold T.

If it is determined at block 180 that the dot product does not satisfy the filter threshold, then at block 176, the current sample is rejected. For example, referring to FIG. 1B, the compressed domain threshold filter 110 may filter or drop the current sample vector. However, if it is determined at block 180 that the dot product satisfies the filter threshold, then at block 185, the current sample is processed or otherwise used by a downstream application. For example, referring to FIG. 1A, one or more of the cores 105A-105N may execute an application that receives and uses the current data sample. In some embodiments, the data sample will first undergo sparse recovery to recover raw (uncompressed) data. After either block 176 or block 185, the sequence 160 is completed. In some embodiments, the sequence 160 may be repeated for each sample vector that is processed by the threshold filter.

Figure 2A:
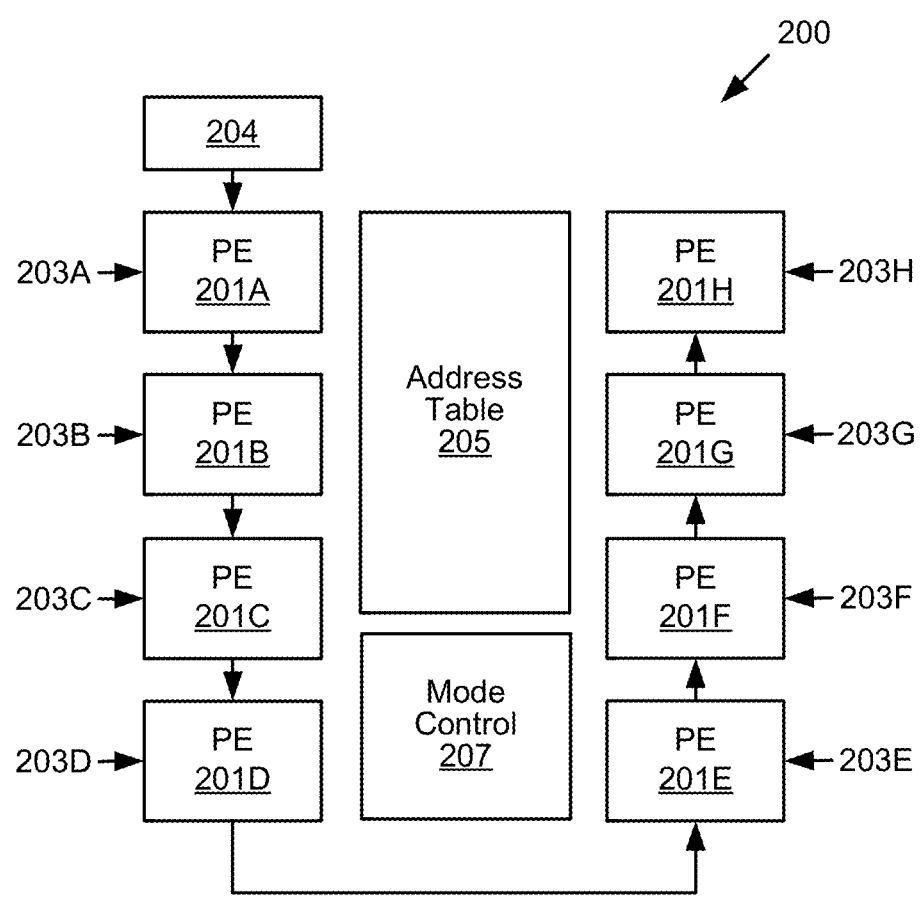
FIG. 2A is a block diagram of an example filtering accelerator in accordance with one or more embodiments.

Referring now to FIG. 2A, shown is a block diagram of an example filtering accelerator 200 in accordance with one or more embodiments. The filtering accelerator 200 may generally correspond to all or a portion of the compressed domain threshold filter 110 shown in FIGS. 1A-1B. In the example of FIG. 2A, the filtering accelerator 200 includes eight processor engines (PEs) 201A-201H (also referred to collectively as "PEs 201").

As shown, in some embodiments, the filtering accelerator 200 may also include a register 204, an address table 205, and a mode control unit 207. The mode control unit 207 may select an operating mode of the filtering accelerator 200. For example, in some embodiments, the mode control unit 207 may control the filtering accelerator 200 to operate in a threshold filtering mode, a steering vector sorting mode, and a covariance computation mode. By enabling the filtering accelerator 200 to operate in these different modes, the need for additional components and/or circuits to perform these different functions is reduced.

In the threshold filtering mode, the PEs 201A-201H may process multiple sample vectors 203A-203H (also referred to collectively as "sample vectors 203") in parallel. For example, the first PE 201A individually processes the sample vector 203A, and determines whether to filter the sample vector 203A.

In some embodiments, the register 204 stores the current steering vector. The register 204 may provide the steering vector elements to the first PE 201A. Further, the steering vector elements may be propagated in sequence through serial connections between the PEs 201, such that PE 201A provides elements of the steering vector to PE 201B, PE 201B provides elements of the steering vector to PE 201C, and so forth. In this manner, each PE 201 may not have to internally store the entire steering vector. In such serial connections, a downstream processor engine (e.g., PE 201B) may be referred to herein as being a "lower" processor engine to an upstream processor engine (e.g., PE 201A).

In the steering vector sorting mode, the PEs 201A-201H may perform a linear sort of the steering vector. For example, the first PE 201A may store the values of a subset of steering vector elements in internal registers, and sort the values of the subset of elements in decreasing order. When the first PE 201A receives an additional element of the steering vector, the first PE 201A may re-sort the stored elements and the received element, and may push the smallest element to the lower PE 201B. This process may be repeated for each element and each PE 201, until all of the element values of the steering vector are stored in descending order across the PEs 201A-201H. Further, the index value i of each element may be stored in the address table 205 in an order corresponding to the sorted element values of the steering vector. For example, assume that a steering vector includes four elements, namely $x_0=6$, $x_1=7$, $x_2=5$, and $x_3=9$. Thus in this example, the PEs 201 may store the element values in a descending order of (9, 7, 6, 5). Further, the address table 205 may store the element index values in a corresponding order of (3, 1, 0, 2).

Figure 2B:
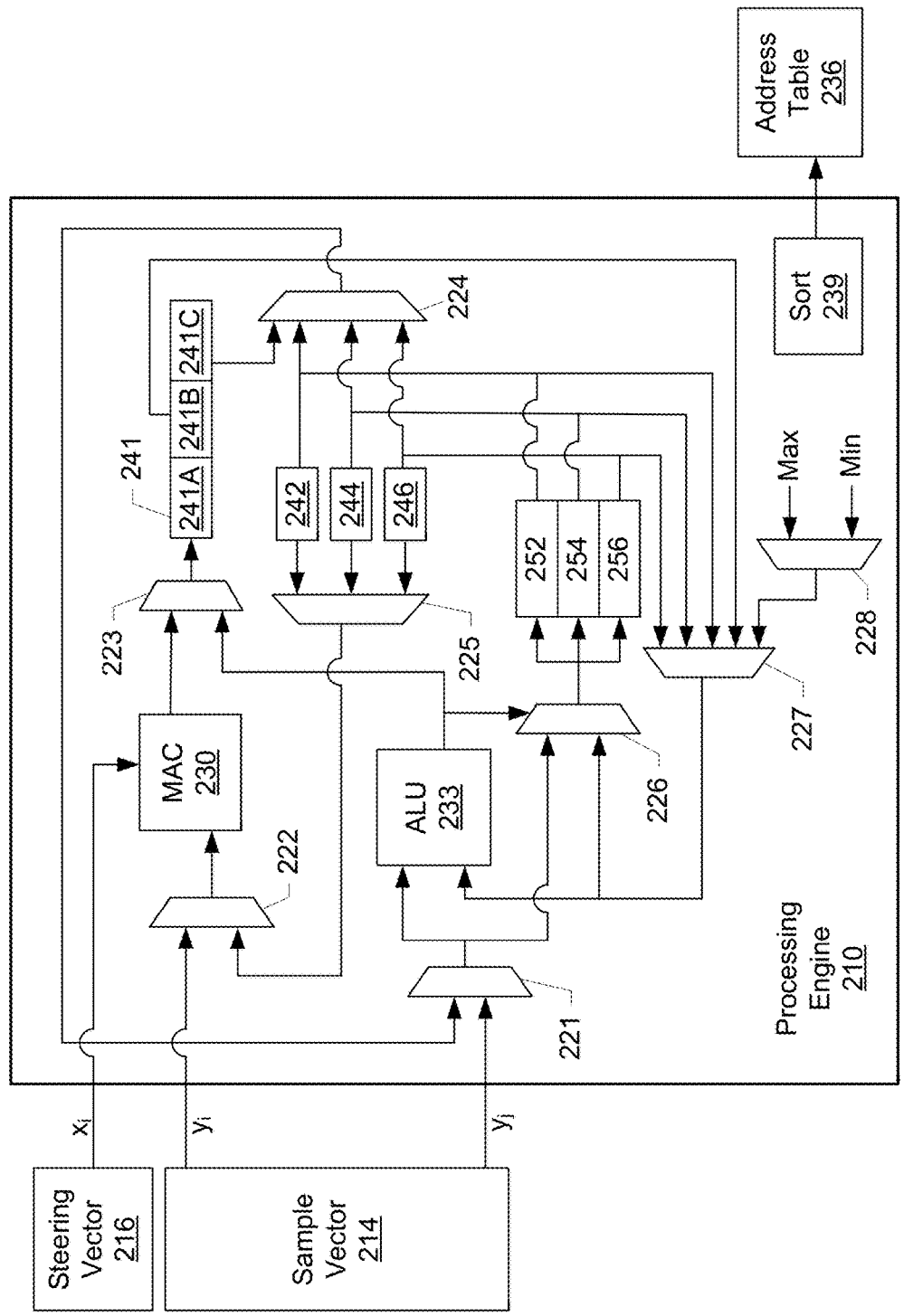
FIG. 2B is a block diagram of an example processor engine in accordance with one or more embodiments.

Referring now to FIG. 2B, shown is a block diagram of an example processor engine (PE) 210 in accordance with one or more embodiments. The PE 210 may be included in a threshold filter unit. For example, the processor engine 210 may generally correspond to one of the PEs 201A-201H included in the filtering accelerator 200 shown in FIG. 2A.

In some embodiments, the PE 210 may be able to selectively operate in a steering vector sorting mode. As shown in FIG. 2B, PE 210 may include a first register 241. While operating in the steering vector sorting mode, the first register 241 may be addressed as three portions, namely the first sub-register 241A, the second sub-register 241B, and the third sub-register 241C shown in FIG. 2B.

In some embodiments, the PE 210 may include a multiplier-accumulator (MAC) 230 to receive elements the steering vector 216. In some embodiments, the MAC 230 may receive one element $x_i$ of the steering vector 216 every four clock cycles. After being received by the MAC 230, a first element $x_0$ may be sent to the multiplexer 223, and may be stored in the third sub-register 241C. The first element $x_0$ is provided to multiplexer 224 and multiplexer 221, and is provided to the arithmetic logic unit (ALU) 233. The sort logic 239 updates the address table 236 with the index value i="0" (corresponding to the first element $x_0$).

When a second element $x_1$ is received, is provided to MAC 230, multiplexer 223, second sub-register 241B, multiplexer 227, and ALU 233 in turn. The ALU 233 then compares the first and second steering vector elements, and outputs the larger value to be stored in the first register 252, and outputs the smaller value to be stored in the second register 254. The sort logic 239 then updates the address table 236 with the index values i="0" and "1" stored in an order corresponding to the descending order of element values stored in the second register 252 and the third register 254.

Similar processing may be performed for the third and fourth steering vector elements, resulting in the first four received steering vector elements being sorted in descending order. In particular, the first four steering vector elements, sorted from largest to smallest, are stored respectively in third sub-register 241C, second register 252, third register 254, and fourth register 256. Further, when the PE 210 receives any subsequent steering vector element, the received steering vector element and the four stored steering vector elements are re-sorted, and the smallest steering vector element is pushed out to a lower processor engine. In this manner, once all elements of the steering vector 216 are received and processed by all PEs 210, the steering vector 216 has been sorted in descending order across the PEs 210. Further, the address table 236 will include the element index values stored in an order corresponding to the descending order of steering vector element values stored across the PEs 210.

In some embodiments, the PE 210 can operate in a threshold filtering mode. Upon initiating the threshold filtering mode, the internal registers of the PE 210 are cleared. For clock cycles 1 to 17 during the threshold filtering mode, the PE 210 simultaneously receives two elements of the sample vector 214 (e.g., a sample including multiple elements of compressed domain data). The PE 210 processes these two elements of the sample vector 214 in two separate paths of the threshold filtering mode. The first path is represented in FIG. 2B by element $y_i$, which is received by the multiplexer 222. Further, the second path is represented by element $y_j$, which is received by the multiplexer 221. These two paths of the threshold filtering mode are described in greater detail below.

In the first path of the threshold filtering mode, the elements of the sample vector are processed in increasing order from the first element. For example, during the first clock cycle after initiating the threshold filtering mode, element $y_i$ is the first element of the sample vector 214 (e.g., $y_0$), and corresponds to the first element of the sorted steering vector 216 (e.g., element $x_0$ with the largest value). In some embodiments, the PE 210 determines the sorted order of the steering vector 216 by using the element index values i stored in the address table 236. Note that these index values i are previously stored in the address table 236 in sorted order during the steering vector sorting mode of the PE 210. In some embodiments, the value of the steering vector element x may be obtained by using the sorted index value i from the address table 236 to retrieve the corresponding value from the register 204 (shown in FIG. 2A).

In one or more embodiments, the MAC 230 multiplies the value of sample vector element $y_i$ (e.g., $y_0$) and the value of the corresponding steering vector $x_i$ (e.g., $x_0$). The resulting product is stored in the first register 241. In some embodiments, while the PE 210 is in the threshold filtering mode, the first register 241 is addressed as a single register location. In the next clock cycle, the MAC 230 multiplies the next sample vector element $y_i$ in the sequence (e.g., $y_i$), and the corresponding steering vector $x_i$ (e.g., $x_1$). The resulting product is added to the value in the first register 241. This operation is repeated so that, over multiple clock cycles, the first register 241 stores the cumulative sum of products. This cumulative sum of products may be referred to herein as a first portion of the dot product of the steering vector and the sample vector.

Turning to the second path of the threshold filtering mode, the elements of the sample vector are processed in decreasing order from the last element. For example, during the first clock cycle after initiating the threshold filtering mode, element $y_j$ is the last element of the sample vector 214, and corresponds to the last element of the sorted steering vector 216 (i.e., the steering vector element with the smallest value).

In the second path, elements $y_j$ are initially received by multiplexer 221. For clock cycles 1-4 of the threshold filtering mode, the ALU 233 compares the four received elements $y_j$, and controls the multiplexer 226 to store the maximum value (i.e., $y_{m28}$) in the fourth register 256. For clock cycles 5-8, the ALU 233 compares the eight received elements $y_j$, and controls the multiplexer 226 to store the maximum value (i.e., $y_{m24}$) in the third register 254. For clock cycles 9-16, the ALU 233 compares the sixteen received elements $y_j$, and controls the multiplexer 226 to store the maximum value (i.e., $y_{m16}$) in the second register 252.

After clock cycle 17 during the threshold filtering of a sample, the second path may be disabled. Stated differently, element $y_j$ may no longer be received by PE 210 after clock cycle 17. Further, by clock cycle 17, a filtering evaluation associated with a checkpoint element i=15 may be performed by combining at least some results of the first path and the second path to calculate an upper bound estimate of the dot product. Specifically, by clock cycle 17, the first register 241 stores the first portion of the dot product corresponding to the first sixteen elements, namely $A_{15}=(x_0y_0+x_1y_1+ \ldots +x_{15}y_{15})$. Further, as discussed above, the second register 252 stores the maximum value $y_{m16}$ of the last sixteen elements of the sample vector. The four-bit shifter 242 performs a left shift of four bits on the maximum value $y_{m16}$, thereby multiplying the maximum value $y_{m16}$ times sixteen. In some embodiments, the multiplexer 225 is controlled to provide the output of the four-bit shifter 242 to the MAC 230. The MAC 230 multiplies the output of the four-bit shifter 242 times the next steering vector element $x_{16}$, thereby producing the estimated remaining portion $B_{15}=16(y_{m16})(x_{16})$. Next, the estimated upper bound $UB_{15}$ can be calculated by summing the first portion of the dot product $A_{15}$ and the estimated remaining portion $B_{15}$. Further, the estimated upper bound $UB_{15}$ may compared to the filter threshold T to determine whether to filter the current sample in association with checkpoint element i=15.

By clock cycle 26, a filtering evaluation associated with a checkpoint element i=23 may be performed. Specifically, the first register 241 stores the first portion of the dot product corresponding to the first twenty-four elements, namely $A_{23}=(x_0y_0+x_1y_1+\ldots+x_{23}y_{23})$. Further, as discussed above, the third register 254 stores the maximum value $y_{m24}$ of the last eight elements of the sample vector. The three-bit shifter 244 performs a left shift of three bits on the maximum value $y_{m24}$, thereby multiplying the maximum value $y_{m24}$ times eight. In some embodiments, the multiplexer 225 is controlled to provide the output of the three-bit shifter 243 to the MAC 230. The MAC 230 multiplies the output of the three-bit shifter 243 times the next steering vector element $x_{24}$, thereby producing the estimated remaining portion $B_{23}=8(y_{m24})(x_{24})$. Next, the estimated upper bound $UB_{23}$ can be calculated by summing the first portion of the dot product $A_{23}$ and the estimated remaining portion $B_{23}$. Further, the estimated upper bound $UB_{23}$ may compared to the filter threshold T to determine whether to filter the current sample in association with checkpoint element i=23.

By clock cycle 31, a filtering evaluation associated with a checkpoint element i=27 may be performed. Specifically, the first register 241 stores the first portion of the dot product corresponding to the first twenty-eight elements, namely $A_{27}=(x_0y_0+x_1y_1+\ldots+x_{27}y_{27})$. Further, as discussed above, the fourth register 256 stores the maximum value $y_{m28}$ of the last four elements of the sample vector. The two-bit shifter 246 performs a left shift of two bits on the maximum value $y_8$, thereby multiplying the maximum value $y_{m28}$ times four. In some embodiments, the multiplexer 225 is controlled to provide the output of the two-bit shifter 246 to the MAC 230. The MAC 230 multiplies the output of the two-bit shifter 246 times the next steering vector element $x_{28}$, thereby producing the estimated remaining portion $B_{27}=4(y_{m28})(x_{28})$. Next, the estimated upper bound $UB_{27}$ can be calculated by summing the first portion of the dot product $A_{27}$ and the estimated remaining portion $B_{27}$. Further, the estimated upper bound $UB_{27}$ may compared to the filter threshold T to determine whether to filter the current sample in association with checkpoint element i=27.

In one or more embodiments, the multiplexer 228 may receive a maximum vector value ("Max") and a minimum vector value ("Min"). For example, for vector elements defined as having five bits, the maximum vector value may be thirty-one, corresponding to the value of "11111" in binary. Further, the minimum vector value may be zero, corresponding to the value of "00000" in binary. The multiplexer 228 may use the Max and Min values to ignore vector element values that are above or below an acceptable range of vector element values.

Figure 2C:
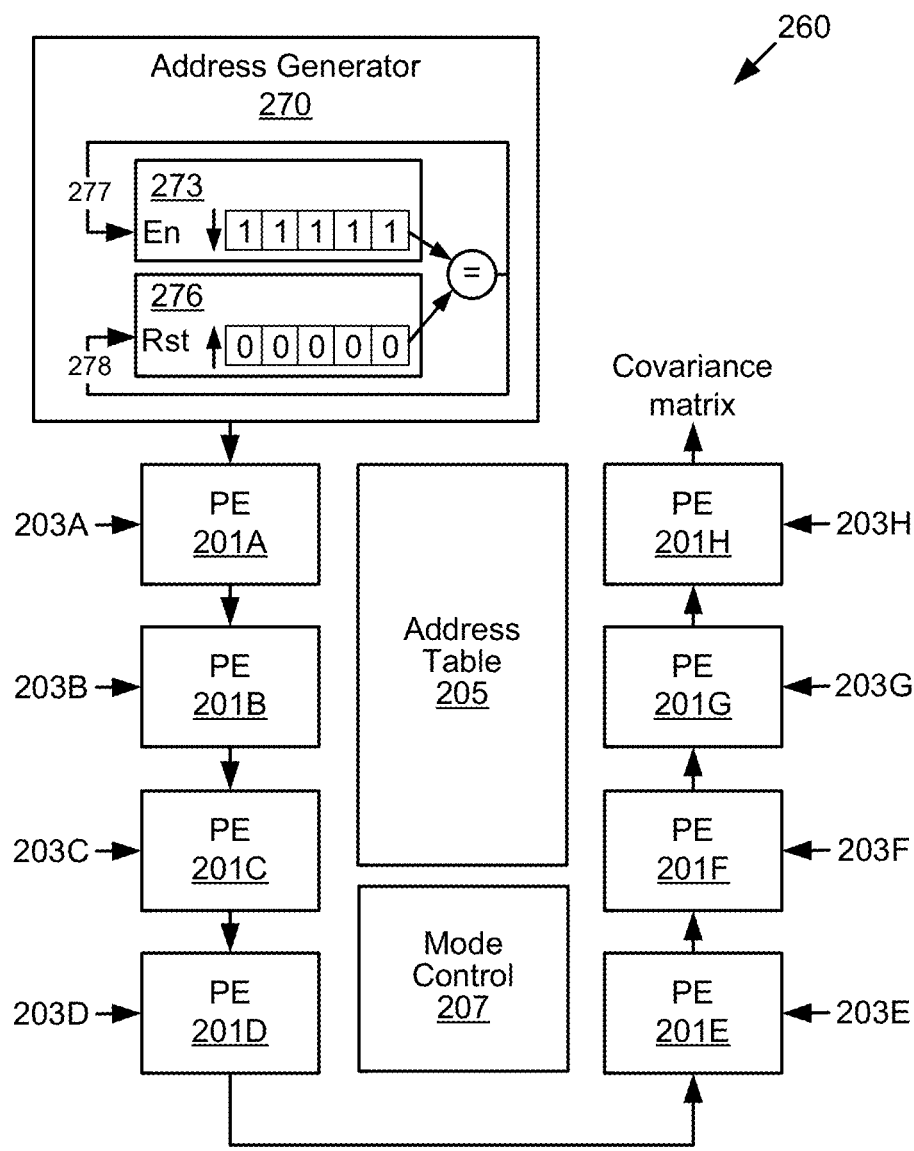
FIG. 2C is a block diagram of an example filtering accelerator in accordance with one or more embodiments.

Referring now to FIG. 2C, shown is a block diagram of an example filtering accelerator 200 in accordance with one or more embodiments. In particular, FIG. 2C shows an example of the filtering accelerator 200 operating in a covariance computation mode. In some embodiments, the filtering accelerator 200 may calculate each element $a_{i,j}$ of an "N by N" covariance matrix using the following formula:

$$a_{i,j}=(\Sigma y_i y_j)/N$$

As shown, the filtering accelerator 200 may include an address generator 270 to generate a set of address pairs based on the number of elements N in a sample vector. In some embodiments, the address generator 270 may include a down counter 273 and an up counter 276. The number of bits in the down counter 273 and the up counter 276 may be determined to represent the binary value of the number of elements N in the sample vector. Assume that, in the example of FIG. 2C, the number of elements in vectors processed by the filtering accelerator 200 is thirty-two, which is "11111" in binary form. Thus, in this example, both the down counter 273 and the up counter 276 include five bits. Initially, the down counter 273 is set at the binary number "11111," and the up counter 276 is set to the binary number "00000." For every clock cycle during the covariance computation mode, the values of the down counter 273 and the up counter 276 may be output to PE 201A as an address pair. For example, in the first clock cycle, PE 201A receives the address pair "31,0" which corresponds to the pair of the current binary value of the down counter 273 (i.e., "11111") and the current binary value of the up counter 276 (i.e., "00000").

In some embodiments, for every clock cycle, the up counter 276 is incremented up by one bit, while the down counter 273 remains at the same value. For example, in the second clock cycle, PE 201A receives the address pair "31,1" which corresponds to the pair of the current binary value of the down counter 273 (i.e., "11111") and the current binary value of the up counter 276 (i.e., "00001"). The up counter 276 is then incremented up in subsequent clock cycles, causing the address generator 270 to output address pairs reflecting the changing value of the up counter 276 (e.g., "31,2", "31,3", and so forth).

In the example of FIG. 2C, when the binary value of the up counter 276 is incremented up to "11111," the values of the down counter 273 and the up counter 276 are equal, and the address generator 270 outputs the address pair "31,31" to PE 201A. In some embodiments, the address generator 270 includes logic (shown by a "=" symbol in FIG. 2C) to detect the equal values of the down counter 273 and the up counter 276. In response to this detection, the address generator 270 sends two signals, namely a first signal 277 sent to the down counter 273, and a second signal 278 sent to the up counter 276. The first signal 277 may activate an "enable" command (shown as "En" in FIG. 2C) of the down counter 273, thereby causing the down counter 273 to increment down by one (i.e., to the binary value "11110"). The second signal 278 may activate an "reset" command (shown as "Rst" in FIG. 2C) of the up counter 276, thereby causing the up counter 276 to reset to the binary value "00000." The address generator 270 then outputs the address pair "30,0" to PE 201A. The up counter 276 is then incremented up in subsequent clock cycles, causing the address generator 270 to output address pairs reflecting the changing value of the up counter 276 (e.g., "30,1", "30,2", and so forth). The address generator 270 may then repeat this process to generate address pairs based on combinations of values of the down counter 273 and the up counter 276. The generated address pairs are provided to the PE 201A.

For each address pair, the first PE 201A retrieves the elements of the sample vector 203A that are identified by each address in the address pair, and multiplies these elements, and then passes the resulting value to the second PE 201B. The second PE 201B retrieves the elements of the sample vector 203B that are identified by each address in the address pair, multiplies these elements, sums the product with the value received from PE 201A, and then passes the result to the third PE 201C. This process is repeated by the remaining PEs 201. The output of the last PE 201 is divided by the number of PEs 201, resulting in the single element of the covariance matrix that is identified by the address pair. After all address pairs are processed in this manner, the elements of a first portion of the covariance matrix have been determined. Further, the elements of the remaining portion of the covariance matrix may be determined by inverting each address pair, and duplicating the elements located in the covariance matrix at the inverted address pair. For example, the value of element "0,1" of the covariance matrix may be determined by copying the value of element "1,0" of the covariance matrix. In some embodiments, the completed covariance matrix may be used to update the steering vector.

For example, assuming vectors with thirty-two elements, the first PE 201A may initially receive the address pair "31,0". In response, the first PE 201A may retrieve and multiply the first and last elements of the sample vector 203A (i.e., elements i=0 and 31). This value is then passed to the second PE 201B. The second PE 201B may retrieve and multiply the first and last elements of the sample vector 203B, and may sum this product with the value received from PE 210A. The remaining PEs 201C-201H repeat this calculation using the address pair "31,0". The output from PE 201H is divided by eight (i.e., the number of PEs 201A-201H), resulting in the single element at location "31,0" of the covariance matrix. Further, element "0,31" is determined by copying element "31,0" of the covariance matrix.

Note that the examples shown in FIGS. 1A-1F and 2A-2C are provided for the sake of illustration, and are not intended to limit any embodiments. For example, it is contemplated that, in some embodiments, the filtering accelerator 200 and/or the processor engine 210 shown in FIGS. 2A-2C may include different components, additional components, different arrangements of components, and/or different numbers of components than shown in FIGS. 2A-2C. Also, in some embodiments, the filtering accelerator 200 and/or the processor engine 210 may use only one operating mode, or in any combination of operating modes. Further, in some embodiments, the sample vector 115 and the steering vector 120 shown in FIGS. 1C-1D may include any number of elements. Furthermore, in some embodiments, the filter thresholds may be maximum levels or minimum levels.

It is also contemplated that, in some embodiments, sample vector elements, steering vector elements, threshold levels, and/or other values may be positive numbers and/or negative numbers. Further, in some embodiments, the filtering accelerator 200 may use any number of checkpoint elements. Furthermore, in some embodiments, the sorting of data described herein may be either in increasing order or in decreasing order.

It is further contemplated that, in some embodiments, the compressed domain threshold filter 110 (shown in FIGS. 1A-1B) and/or the filtering accelerator 200 and/or the processor engine 210 (shown in FIGS. 2A-2C) may be implemented as a dedicated accelerator chip, as an Intellectual Property (IP) block, in a processor, in a processing core, in a System on a Chip (SoC), in a chipset, or in any other device. It should be understood that the systems, apparatus, and methods described herein can include various combinations and/or sub-combinations of the components and/or features of the different implementations described with reference to FIGS. 1A-1F and 2A-2C. It is contemplated that specifics in the examples shown in FIGS. 1A-1F and 2A-2C may be used anywhere in one or more embodiments.

Figure 3A:
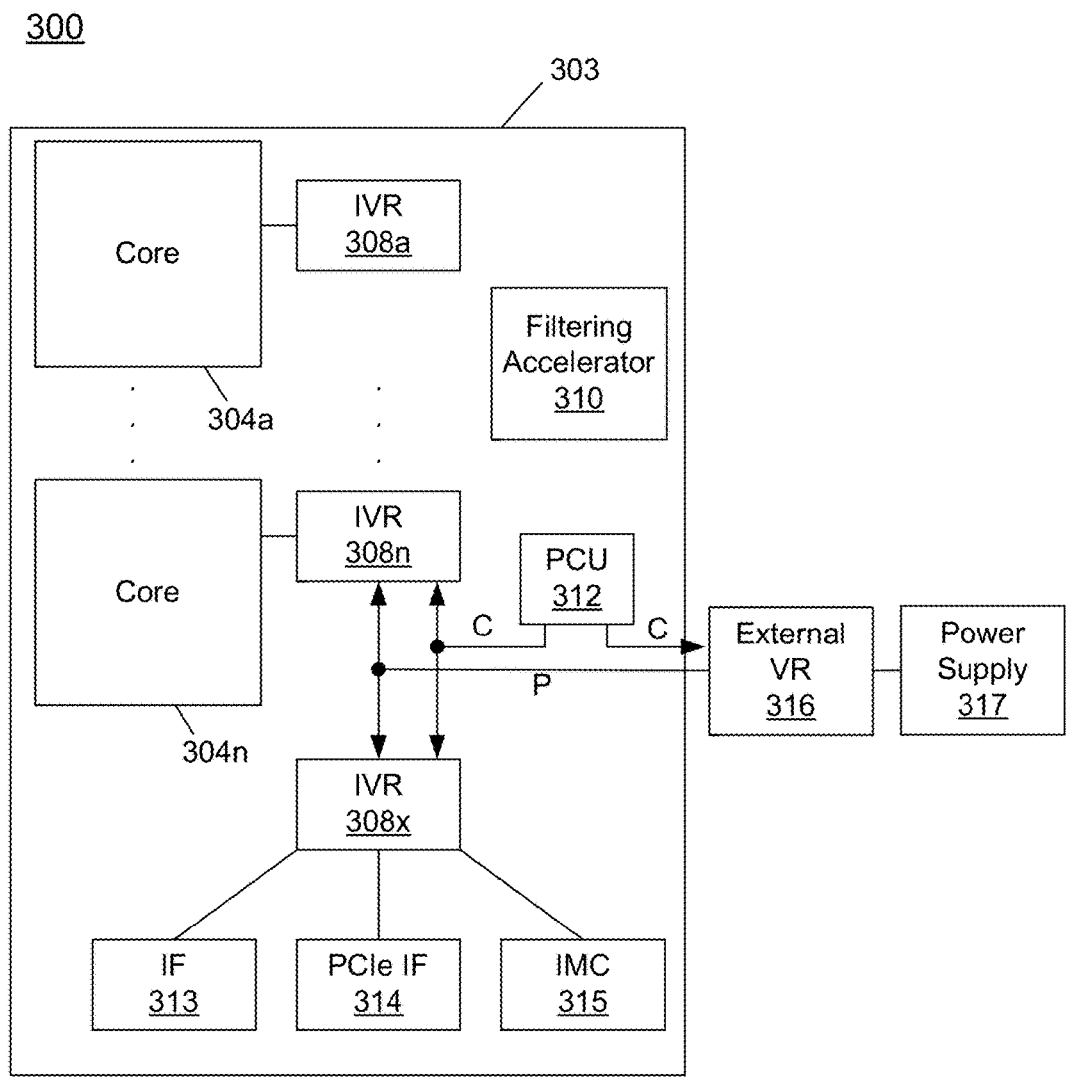
FIG. 3A is a block diagram of a portion of a system in accordance with one or more embodiments.

Referring now to FIG. 3A, shown is a block diagram of a system 300 in accordance with an embodiment of the present invention. As shown in FIG. 3A, system 300 may include various components, including a processor 303 which as shown is a multicore processor. Processor 303 may be coupled to a power supply 317 via an external voltage regulator 316, which may perform a first voltage conversion to provide a primary regulated voltage to processor 303.

As seen, processor 303 may be a single die processor including multiple cores $304_a$-$304_n$. In addition, each core 304 may be associated with an integrated voltage regulator (IVR) $308_a$-$308_n$ which receives the primary regulated voltage and generates an operating voltage to be provided to one or more agents of the processor associated with the IVR 308. Accordingly, an IVR implementation may be provided to allow for fine-grained control of voltage and thus power and performance of each individual core 304. As such, each core 304 can operate at an independent voltage and frequency, enabling great flexibility and affording wide opportunities for balancing power consumption with performance. In some embodiments, the use of multiple IVRs 308 enables the grouping of components into separate power planes, such that power is regulated and supplied by the IVR 308 to only those components in the group. During power management, a given power plane of one IVR 308 may be powered down or off when the processor is placed into a certain low power state, while another power plane of another IVR 308 remains active, or fully powered.

Still referring to FIG. 3A, additional components may be present within the processor including an input/output interface 313, another interface 314, and an integrated memory controller 315. As seen, each of these components may be powered by another integrated voltage regulator $308_x$. In one embodiment, interface 313 may be in accordance with the Intel® Quick Path Interconnect (QPI) protocol, which provides for point-to-point (PtP) links in a cache coherent protocol that includes multiple layers including a physical layer, a link layer and a protocol layer. In turn, interface 314 may be in accordance with a Peripheral Component Interconnect Express (PCIe™) specification, e.g., the PCI Express™ Specification Base Specification version 2.0 (published Jan. 17, 2007).

Also shown is a power control unit (PCU) 312, which may include hardware, software and/or firmware to perform power management operations with regard to processor 303. As seen, PCU 312 provides control information to external voltage regulator 316 via a digital interface to cause the external voltage regulator 316 to generate the appropriate regulated voltage. PCU 312 also provides control information to IVRs 308 via another digital interface to control the operating voltage generated (or to cause a corresponding IVR 308 to be disabled in a low power mode). In some embodiments, the control information provided to IVRs 308 may include a power state of a corresponding core 304.

In various embodiments, PCU 312 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or management power management source or system software).

In some embodiments, the filtering accelerator 310 may generally correspond to the compressed domain threshold filter 110 shown in FIGS. 1A-1B, or the filtering accelerator 200 and/or processor engine 210 shown in FIGS. 2A-2C.

Further, the processor 303 and/or any of the cores 304 may include some or all of the compressed domain threshold filter 110 shown in FIGS. 1A-1B, and/or the filtering accelerator 200 and/or processor engine 210 shown in FIGS. 2A-2C. While not shown for ease of illustration, understand that additional components may be present within processor 303 such as uncore logic, and other components such as internal memories, e.g., one or more levels of a cache memory hierarchy and so forth. Furthermore, while shown in the implementation of FIG. 3A with an external voltage regulator, embodiments are not so limited.

Figure 3B:
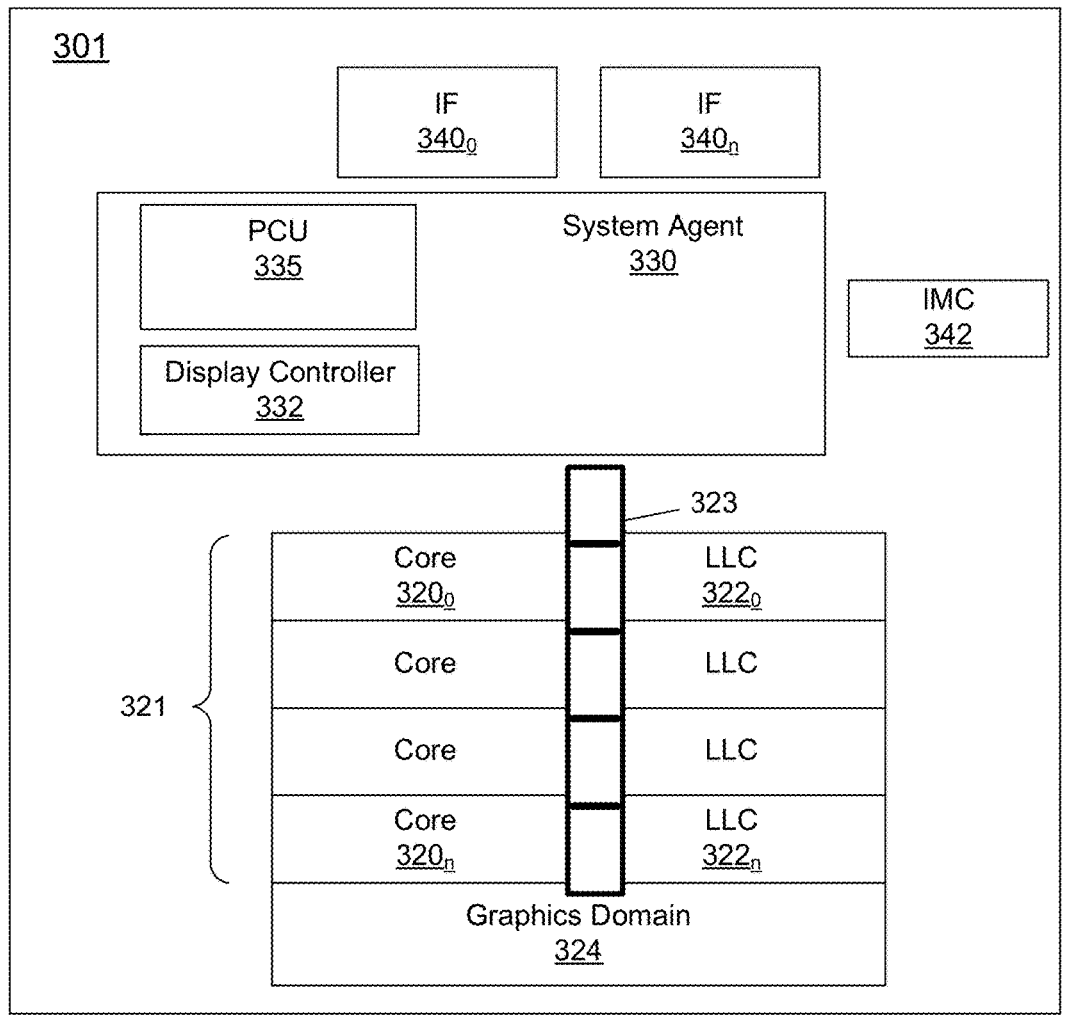
FIG. 3B is a block diagram of a multi-domain processor in accordance with one or more embodiments.

Embodiments can be implemented in processors for various markets including server processors, desktop processors, mobile processors and so forth. Referring now to FIG. 3B, shown is a block diagram of a multi-domain processor 301 in accordance with one or more embodiments. As shown in the embodiment of FIG. 3B, processor 301 includes multiple domains. Specifically, a core domain 321 can include a plurality of cores $320_0$-$320_n$, a graphics domain 324 can include one or more graphics engines, and a system agent domain 330 may further be present. In some embodiments, system agent domain 330 may execute at an independent frequency than the core domain and may remain powered on at all times to handle power control events and power management such that domains 321 and 324 can be controlled to dynamically enter into and exit high power and low power states. Each of domains 321 and 324 may operate at different voltage and/or power. Note that while only shown with three domains, understand the scope of the present invention is not limited in this regard and additional domains can be present in other embodiments. For example, multiple core domains may be present, with each core domain including at least one core.

In general, each core 320 may further include low level caches in addition to various execution units and additional processing elements. In turn, the various cores may be coupled to each other and to a shared cache memory formed of a plurality of units of a last level cache (LLC) $322_0$-$322_n$. In various embodiments, LLC 322 may be shared amongst the cores and the graphics engine, as well as various media processing circuitry. As seen, a ring interconnect 323 thus couples the cores together, and provides interconnection between the cores 320, graphics domain 324 and system agent domain 330. In one embodiment, interconnect 323 can be part of the core domain 321. However, in other embodiments, the ring interconnect 323 can be of its own domain.

As further seen, system agent domain 330 may include display controller 332 which may provide control of and an interface to an associated display. In addition, system agent domain 330 may include a power control unit 335 to perform power management.

As further seen in FIG. 3B, processor 301 can further include an integrated memory controller (IMC) 342 that can provide for an interface to a system memory, such as a dynamic random access memory (DRAM). Multiple interfaces $340_0$-$340_n$ may be present to enable interconnection between the processor and other circuitry. For example, in one embodiment at least one direct media interface (DMI) interface may be provided as well as one or more PCIe™ interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 3B, understand the scope of the present invention is not limited in this regard.

Although not shown for ease of illustration in FIG. 3B, in some embodiments, processor 301 and/or the cores $320_0$-$320_n$ may include the compressed domain threshold filter 110 shown in FIGS. 1A-1B, and/or the filtering accelerator 200 and/or processor engine 210 shown in FIGS. 2A-2C.

While not shown for ease of illustration, understand that additional components may be present within processor 303 such as uncore logic, and other components such as internal memories, e.g., one or more levels of a cache memory hierarchy and so forth. Furthermore, while shown in the implementation of FIG. 3A with an external voltage regulator, embodiments are not so limited.

Figure 3C:
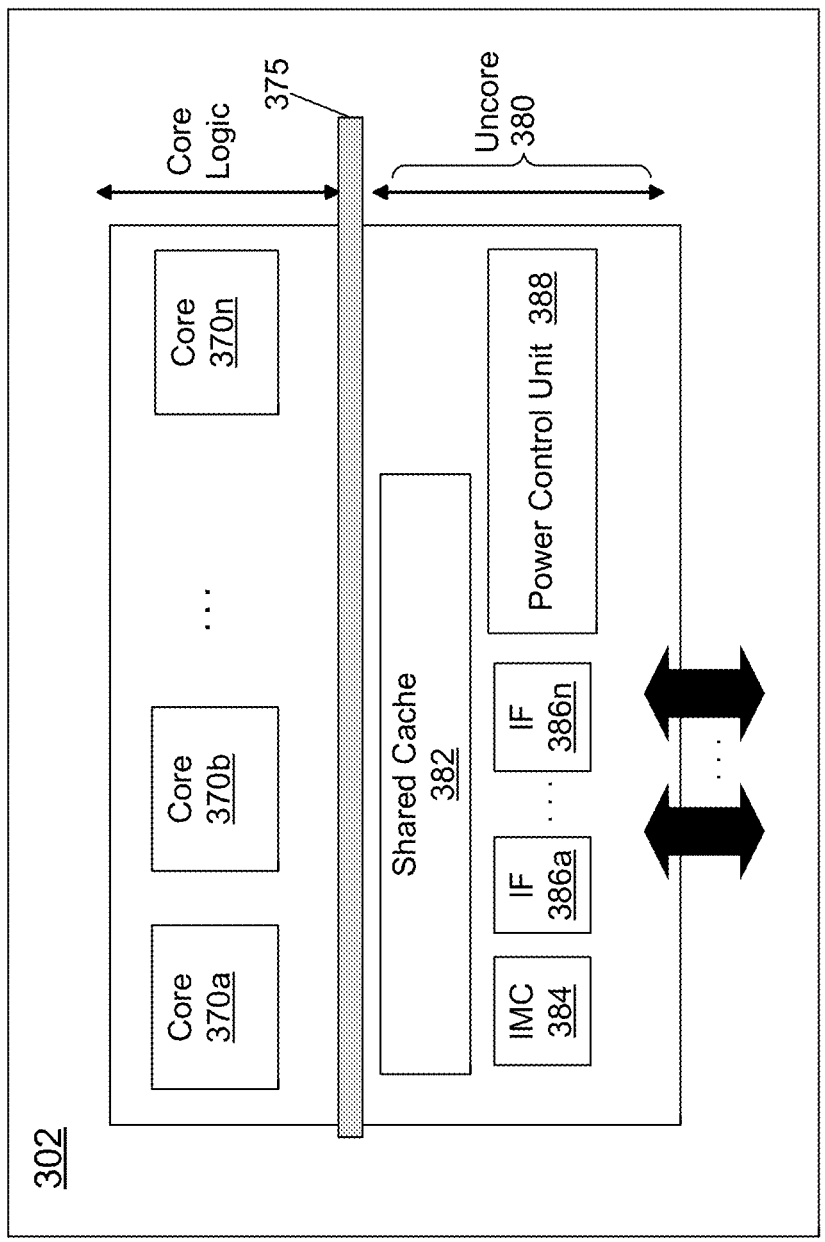
FIG. 3C is a block diagram of a processor in accordance with one or more embodiments.

Referring now to FIG. 3C, shown is a block diagram of a processor 302 in accordance with an embodiment of the present invention. As shown in FIG. 3C, processor 302 may be a multicore processor including a plurality of cores $370_a$-$370_n$. In one embodiment, each such core may be of an independent power domain and can be configured to enter and exit active states and/or maximum performance states based on workload. The various cores may be coupled via an interconnect 375 to a system agent or uncore 380 that includes various components. As seen, the uncore 380 may include a shared cache 382 which may be a last level cache. In addition, the uncore 380 may include an integrated memory controller 384 to communicate with a system memory (not shown in FIG. 3C), e.g., via a memory bus. Uncore 380 also includes various interfaces 386a-386n and a power control unit 388, which may include logic to perform the power management techniques described herein.

In addition, by interfaces 386a-386n, connection can be made to various off-chip components such as peripheral devices, mass storage and so forth. While shown with this particular implementation in the embodiment of FIG. 3C, the scope of the present invention is not limited in this regard.

Although not shown for ease of illustration in FIG. 3C, in some embodiments, processor 302 and/or any of the cores 370a-370n may include the compressed domain threshold filter 110 shown in FIGS. 1A-1B, and/or the filtering accelerator 200 and/or processor engine 210 shown in FIGS. 2A-2C.

Figure 4:
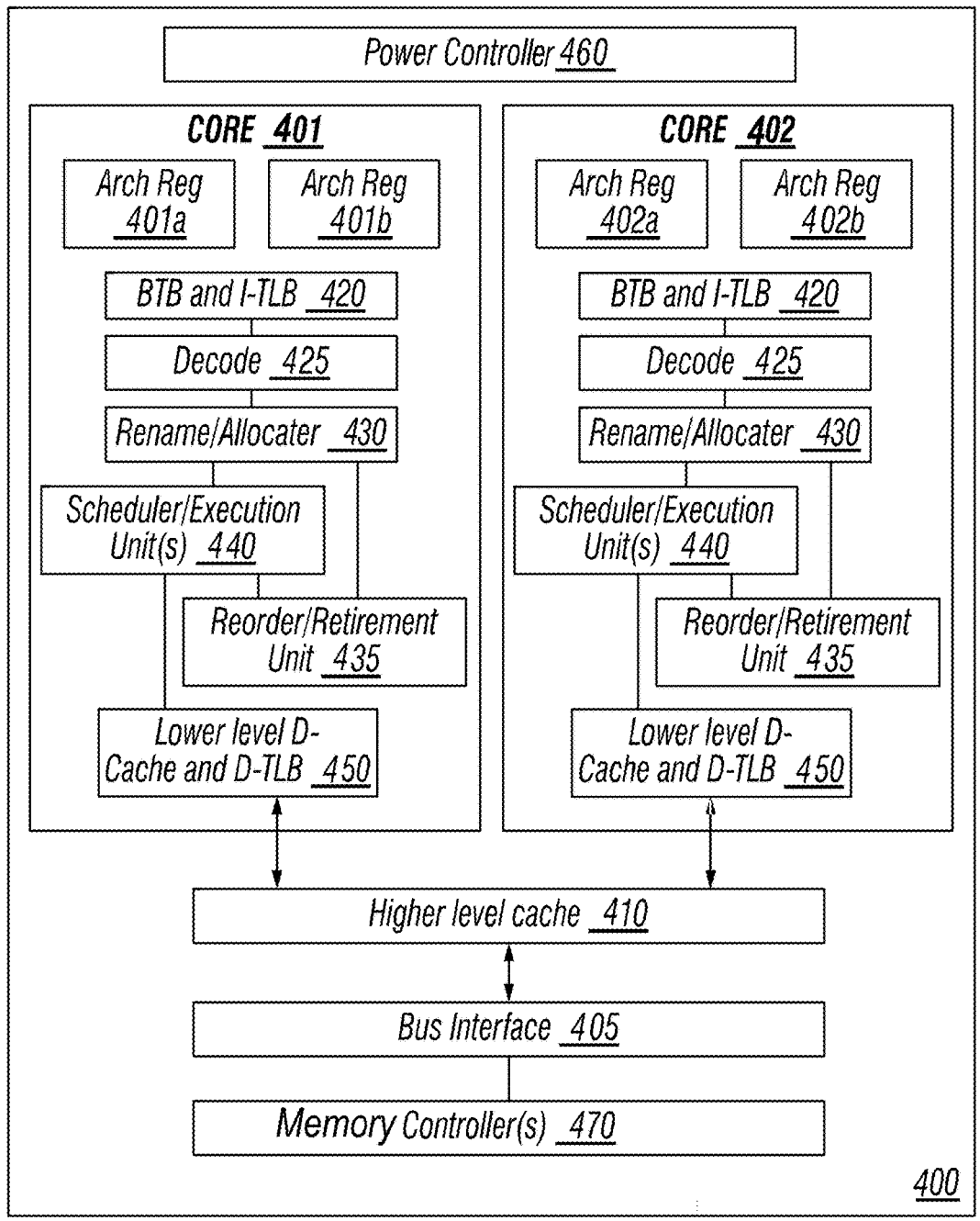
FIG. 4 is a block diagram of a processor including multiple cores in accordance with one or more embodiments.

Referring to FIG. 4, an embodiment of a processor including multiple cores is illustrated. Processor 400 includes any processor or processing device, such as a microprocessor, an embedded processor, a digital signal processor (DSP), a network processor, a handheld processor, an application processor, a co-processor, a system on a chip (SoC), or other device to execute code. Processor 400, in one embodiment, includes at least two cores—cores 401 and 402, which may include asymmetric cores or symmetric cores (the illustrated embodiment). However, processor 400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 400, as illustrated in FIG. 4, includes two cores, cores 401 and 402. Here, cores 401 and 402 are considered symmetric cores, i.e., cores with the same configurations, functional units, and/or logic. In another embodiment, core 401 includes an out-of-order processor core, while core 402 includes an in-order processor core. However, cores 401 and 402 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 401 are described in further detail below, as the units in core 402 operate in a similar manner.

As depicted, core 401 includes two hardware threads 401a and 401b, which may also be referred to as hardware thread slots 401a and 401b. Therefore, software entities, such as an operating system, in one embodiment potentially view processor 400 as four separate processors, i.e., four logical processors or processing elements capable of executing four software threads concurrently. As alluded to above, a first thread is associated with architecture state registers 401a, a second thread is associated with architecture state registers 401b, a third thread may be associated with architecture state registers 402a, and a fourth thread may be associated with architecture state registers 402b. Here, each of the architecture state registers (401a, 401b, 402a, and 402b) may be referred to as processing elements, thread slots, or thread units, as described above. As illustrated, architecture state registers 401a are replicated in architecture state registers 401b, so individual architecture states/contexts are capable of being stored for logical processor 401a and logical processor 401b. In core 401, other smaller resources, such as instruction pointers and renaming logic in allocator and renamer block 430 may also be replicated for threads 401a and 401b. Some resources, such as re-order buffers in reorder/retirement unit 435, ILTB 420, load/store buffers, and queues may be shared through partitioning. Other resources, such as general purpose internal registers, page-table base register(s), low-level data-cache and data-TLB 415, execution unit(s) 440, and portions of out-of-order unit 435 are potentially fully shared.

Processor 400 often includes other resources, which may be fully shared, shared through partitioning, or dedicated by/to processing elements. In FIG. 4, an embodiment of a purely exemplary processor with illustrative logical units/resources of a processor is illustrated. Note that a processor may include, or omit, any of these functional units, as well as include any other known functional units, logic, or firmware not depicted. As illustrated, core 401 includes a simplified, representative out-of-order (OOO) processor core. But an in-order processor may be utilized in different embodiments. The OOO core includes a branch target buffer 420 to predict branches to be executed/taken and an instruction-translation buffer (I-TLB) 420 to store address translation entries for instructions.

Core 401 further includes decode module 425 coupled to fetch unit 420 to decode fetched elements. Fetch logic, in one embodiment, includes individual sequencers associated with thread slots 401a, 401b, respectively. Usually core 401 is associated with a first ISA, which defines/specifies instructions executable on processor 400. Often machine code instructions that are part of the first ISA include a portion of the instruction (referred to as an opcode), which references/specifies an instruction or operation to be performed. Decode logic 425 includes circuitry that recognizes these instructions from their opcodes and passes the decoded instructions on in the pipeline for processing as defined by the first ISA. For example, decoders 425, in one embodiment, include logic designed or adapted to recognize specific instructions, such as transactional instruction. As a result of the recognition by decoders 425, the architecture or core 401 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 430 includes an allocator to reserve resources, such as register files to store instruction processing results. However, threads 401a and 401b are potentially capable of out-of-order execution, where allocator and renamer block 430 also reserves other resources, such as reorder buffers to track instruction results. Unit 430 may also include a register renamer to rename program/instruction reference registers to other registers internal to processor 400. Reorder/retirement unit 435 includes components, such as the reorder buffers mentioned above, load buffers, and store buffers, to support out-of-order execution and later in-order retirement of instructions executed out-of-order.

Scheduler and execution unit(s) block 440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 450 are coupled to execution unit(s) 440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 401 and 402 share access to higher-level or further-out cache 410, which is to cache recently fetched elements. Note that higher-level or further-out refers to cache levels increasing or getting further away from the execution unit(s). In one embodiment, higher-level cache 410 is a last-level data cache—last cache in the memory hierarchy on processor 400—such as a second or third level data cache. However, higher level cache 410 is not so limited, as it may be associated with or includes an instruction cache. A trace cache—a type of instruction cache—instead may be coupled after decoder 425 to store recently decoded traces.

In the depicted configuration, processor 400 also includes bus interface module 405 and a power controller 460, which may perform power management in accordance with an embodiment of the present invention. In this scenario, bus interface 405 is to communicate with devices external to processor 400, such as system memory and other components.

A memory controller 470 may interface with other devices such as one or many memories. In an example, bus interface 405 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Although not shown for ease of illustration in FIG. 4, in some embodiments, processor 400 and/or cores 401 and 402 may include the compressed domain threshold filter 110 shown in FIGS. 1A-1B, and/or the filtering accelerator 200 and/or processor engine 210 shown in FIGS. 2A-2C.

Figure 5:
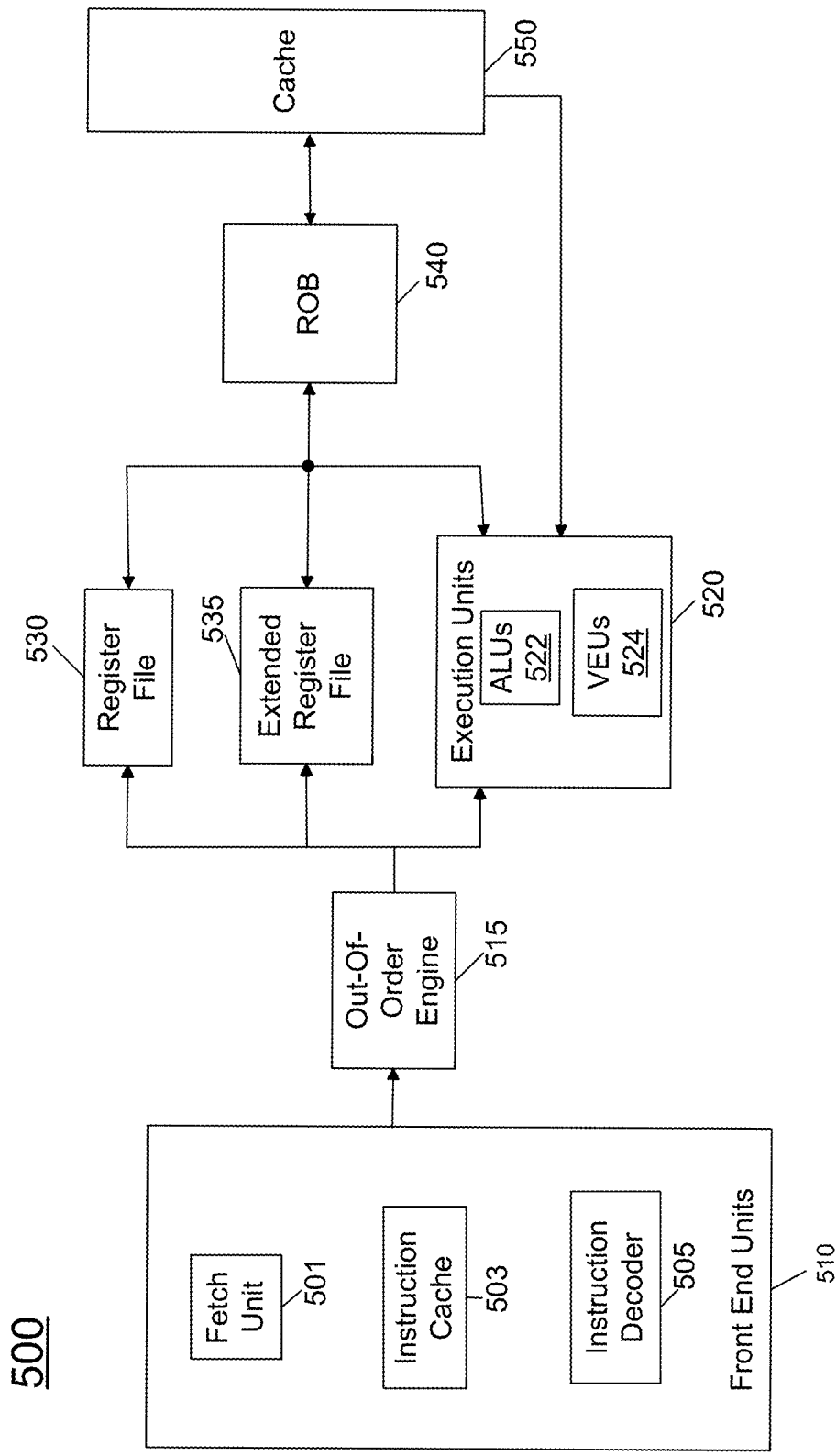
FIG. 5 is a block diagram of a micro-architecture of a processor core in accordance with one or more embodiments.

Referring now to FIG. 5, shown is a block diagram of a micro-architecture of a processor core in accordance with one embodiment of the present invention. As shown in FIG. 5, processor core 500 may be a multi-stage pipelined out-of-order processor. Core 500 may operate at various voltages based on a received operating voltage, which may be received from an integrated voltage regulator or external voltage regulator.

As seen in FIG. 5, core 500 includes front end units 510, which may be used to fetch instructions to be executed and prepare them for use later in the processor pipeline. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. Extended register file 535 may provide storage for vector-sized units, e.g., 256 or 512 bits per register.

Various resources may be present in execution units 520, including, for example, various integer, floating point, and single instruction multiple data (SIMD) logic units, among other specialized hardware. For example, such execution units may include one or more arithmetic logic units (ALUs) 522 and one or more vector execution units 524, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 5, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. While shown with this high level in the embodiment of FIG. 5, understand the scope of the present invention is not limited in this regard. For example, while the implementation of FIG. 5 is with regard to an out-of-order machine such as of an Intel® x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Although not shown for ease of illustration in FIG. 5, in some embodiments, the core 500 may include the compressed domain threshold filter 110 shown in FIGS. 1A-1B, and/or the filtering accelerator 200 and/or processor engine 210 shown in FIGS. 2A-2C.

Figure 6:
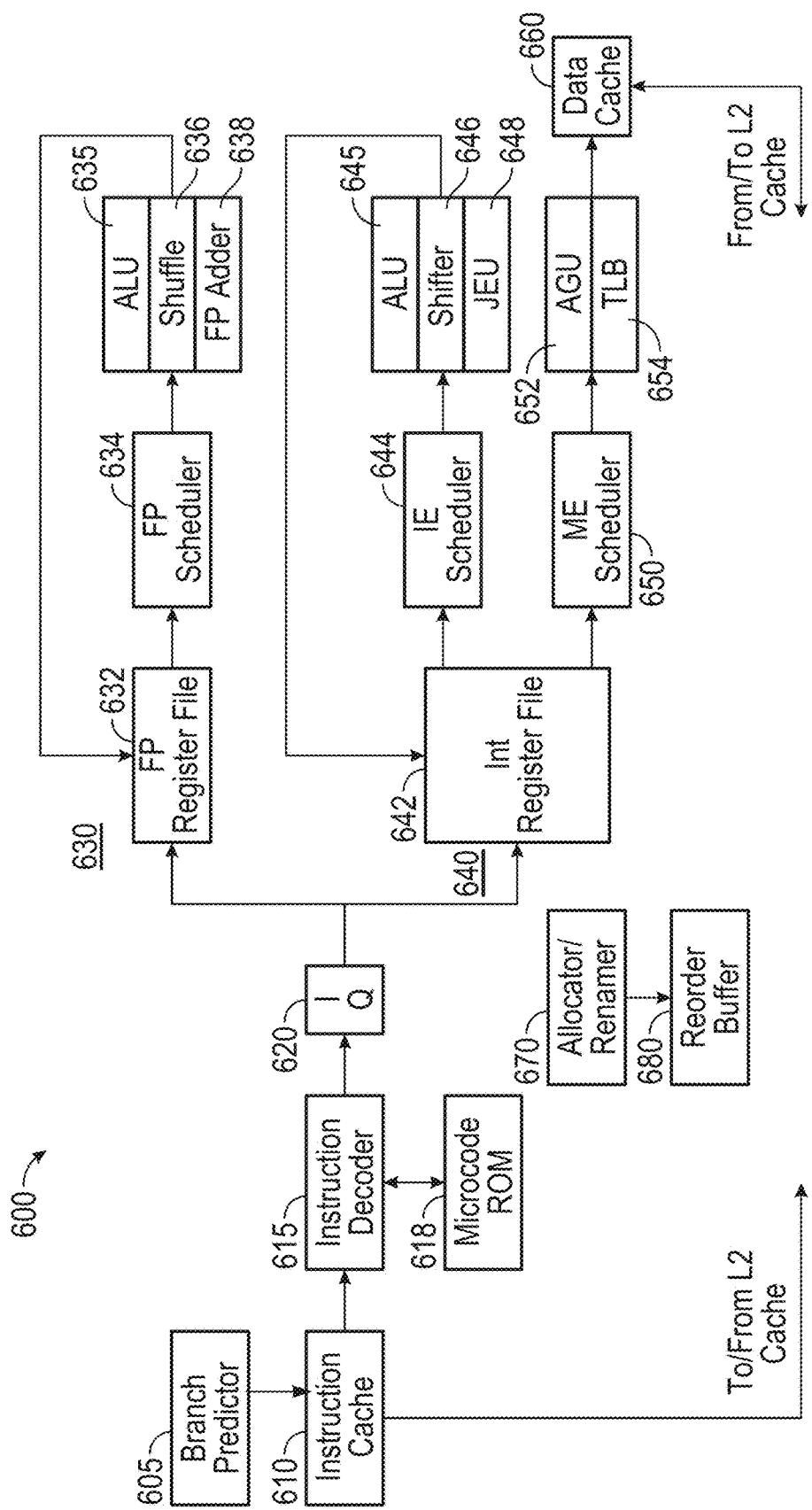
FIG. 6 is a block diagram of a micro-architecture of a processor core in accordance with one or more embodiments.

Referring now to FIG. 6, shown is a block diagram of a micro-architecture of a processor core in accordance with another embodiment. In the embodiment of FIG. 6, core 600 may be a low power core of a different micro-architecture, such as an Intel® Atom™-based processor having a relatively limited pipeline depth designed to reduce power consumption. As seen, core 600 includes an instruction cache 610 coupled to provide instructions to an instruction decoder 615. A branch predictor 605 may be coupled to instruction cache 610. Note that instruction cache 610 may further be coupled to another level of a cache memory, such as an L2 cache (not shown for ease of illustration in FIG. 6). In turn, instruction decoder 615 provides decoded instructions to an issue queue 620 for storage and delivery to a given execution pipeline. A microcode ROM 618 is coupled to instruction decoder 615.

A floating point pipeline 630 includes a floating point register file 632 which may include a plurality of architectural registers of a given bit with such as 128, 256 or 512 bits. Pipeline 630 includes a floating point scheduler 634 to schedule instructions for execution on one of multiple execution units of the pipeline. In the embodiment shown, such execution units include an ALU 635, a shuffle unit 636, and a floating point adder 638. In turn, results generated in these execution units may be provided back to buffers and/or registers of register file 632. Of course understand while shown with these few example execution units, additional or different floating point execution units may be present in another embodiment.

An integer pipeline 640 also may be provided. In the embodiment shown, pipeline 640 includes an integer register file 642 which may include a plurality of architectural registers of a given bit with such as 128 or 256 bits. Pipeline 640 includes an integer scheduler 644 to schedule instructions for execution on one of multiple execution units of the pipeline. In the embodiment shown, such execution units include an ALU 645, a shifter unit 646, and a jump execution unit 648. In turn, results generated in these execution units may be provided back to buffers and/or registers of register file 642. Of course understand while shown with these few example execution units, additional or different integer execution units may be present in another embodiment.

A memory execution scheduler 650 may schedule memory operations for execution in an address generation unit 652, which is also coupled to a TLB 654. As seen, these structures may couple to a data cache 660, which may be a L0 and/or L1 data cache that in turn couples to additional levels of a cache memory hierarchy, including an L2 cache memory.

To provide support for out-of-order execution, an allocator/renamer 670 may be provided, in addition to a reorder buffer 680, which is configured to reorder instructions executed out of order for retirement in order. Although shown with this particular pipeline architecture in the illustration of FIG. 6, understand that many variations and alternatives are possible.

Note that in a processor having asymmetric cores, such as in accordance with the micro-architectures of FIGS. 5 and 6, workloads may be dynamically swapped between the cores for power management reasons, as these cores, although having different pipeline designs and depths, may be of the same or related ISA. Such dynamic core swapping may be performed in a manner transparent to a user application (and possibly kernel also).

Although not shown for ease of illustration in FIG. 6, in some embodiments, the core 600 may include the compressed domain threshold filter 110 shown in FIGS. 1A-1B, and/or the filtering accelerator 200 and/or processor engine 210 shown in FIGS. 2A-2C.

Figure 7:
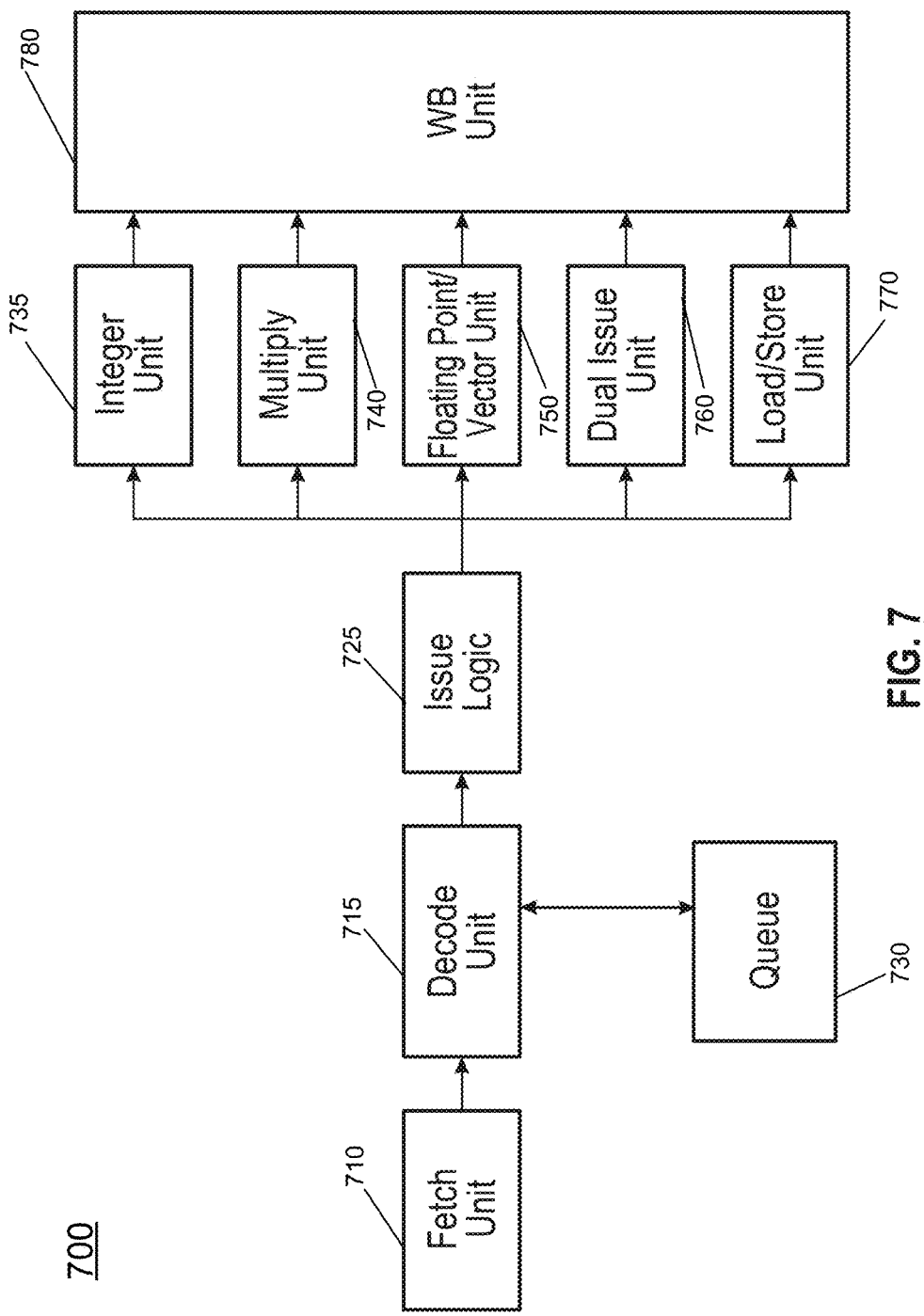
FIG. 7 is a block diagram of a micro-architecture of a processor core in accordance with one or more embodiments.

Referring to FIG. 7, shown is a block diagram of a micro-architecture of a processor core in accordance with yet another embodiment. As illustrated in FIG. 7, a core 700 may include a multi-staged in-order pipeline to execute at very low power consumption levels. As one such example, processor 700 may have a micro-architecture in accordance with an ARM Cortex A53 design available from ARM Holdings, LTD., Sunnyvale, Calif. In an implementation, an 8-stage pipeline may be provided that is configured to execute both 32-bit and 64-bit code. Core 700 includes a fetch unit 710 that is configured to fetch instructions and provide them to a decode unit 715, which may decode the instructions, e.g., macro-instructions of a given ISA such as an ARMv8 ISA. Note further that a queue 730 may couple to decode unit 715 to store decoded instructions. Decoded instructions are provided to an issue logic 725, where the decoded instructions may be issued to a given one of multiple execution units.

With further reference to FIG. 7, issue logic 725 may issue instructions to one of multiple execution units. In the embodiment shown, these execution units include an integer unit 735, a multiply unit 740, a floating point/vector unit 750, a dual issue unit 760, and a load/store unit 770. The results of these different execution units may be provided to a writeback unit 780. Understand that while a single writeback unit is shown for ease of illustration, in some implementations separate writeback units may be associated with each of the execution units. Furthermore, understand that while each of the units and logic shown in FIG. 7 is represented at a high level, a particular implementation may include more or different structures. A processor designed using one or more cores having a pipeline as in FIG. 7 may be implemented in many different end products, extending from mobile devices to server systems.

Although not shown for ease of illustration in FIG. 7, in some embodiments, the core 700 may include the compressed domain threshold filter 110 shown in FIGS. 1A-1B, and/or the filtering accelerator 200 and/or processor engine 210 shown in FIGS. 2A-2C.

Figure 8:
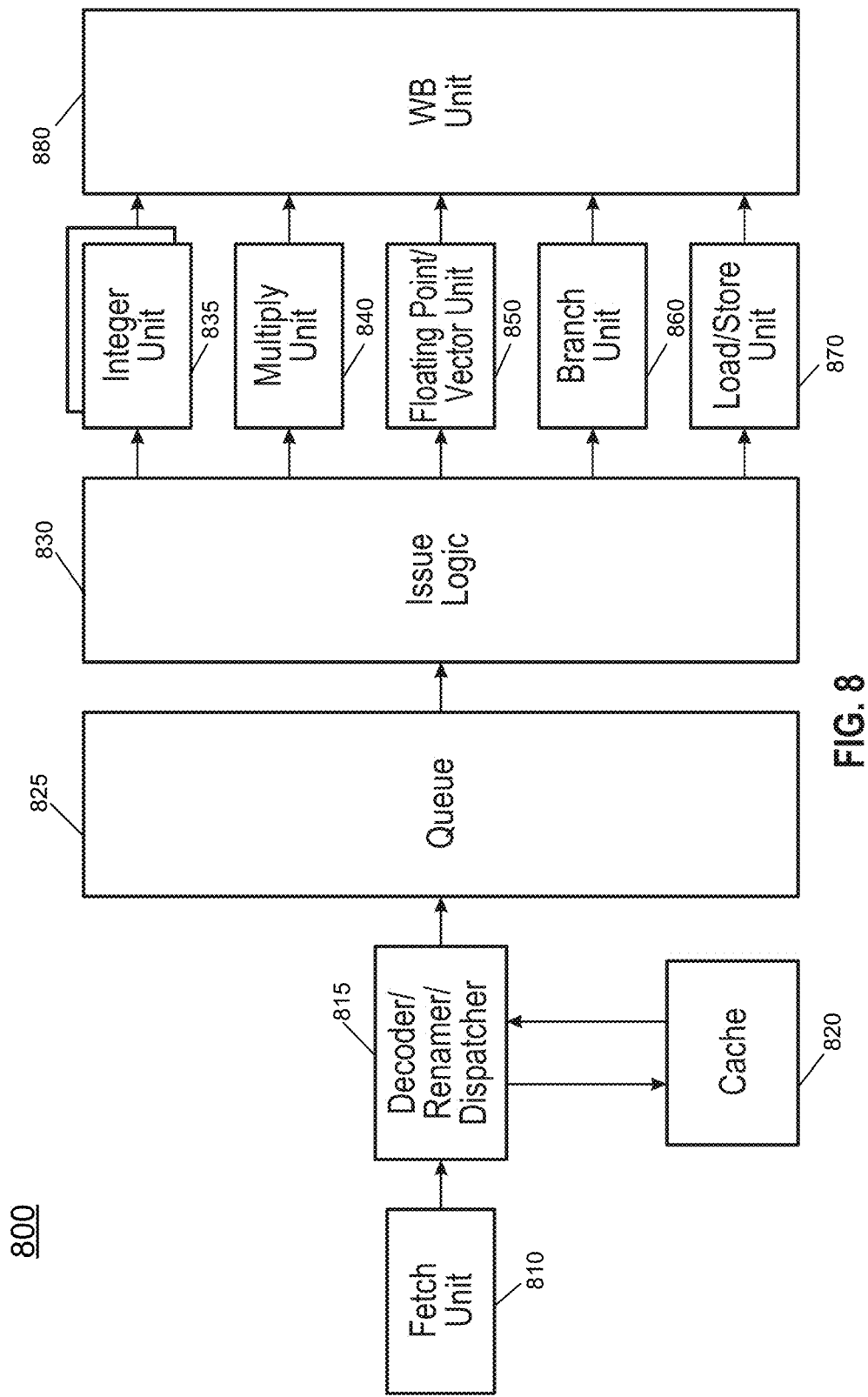
FIG. 8 is a block diagram of a micro-architecture of a processor core in accordance with one or more embodiments.

Referring now to FIG. 8, shown is a block diagram of a micro-architecture of a processor core in accordance with a still further embodiment. As illustrated in FIG. 8, a core 800 may include a multi-stage multi-issue out-of-order pipeline to execute at very high performance levels (which may occur at higher power consumption levels than core 700 of FIG. 7). As one such example, processor 800 may have a microarchitecture in accordance with an ARM Cortex A57 design. In an implementation, a 15 (or greater)-stage pipeline may be provided that is configured to execute both 32-bit and 64-bit code. In addition, the pipeline may provide for 3 (or greater)-wide and 3 (or greater)-issue operation. Core 800 includes a fetch unit 810 that is configured to fetch instructions and provide them to a decoder/renamer/dispatcher 815, which may decode the instructions, e.g., macro-instructions of an ARMv8 instruction set architecture, rename register references within the instructions, and dispatch the instructions (eventually) to a selected execution unit. Decoded instructions may be stored in a queue 825. Note that while a single queue structure is shown for ease of illustration in FIG. 8, understand that separate queues may be provided for each of the multiple different types of execution units.

Also shown in FIG. 8 is an issue logic 830 from which decoded instructions stored in queue 825 may be issued to a selected execution unit. Issue logic 830 also may be implemented in a particular embodiment with a separate issue logic for each of the multiple different types of execution units to which issue logic 830 couples.

Decoded instructions may be issued to a given one of multiple execution units. In the embodiment shown, these execution units include one or more integer units 835, a multiply unit 840, a floating point/vector unit 850, a branch unit 860, and a load/store unit 870. In an embodiment, floating point/vector unit 850 may be configured to handle SIMD or vector data of 128 or 256 bits. Still further, floating point/vector execution unit 850 may perform IEEE-754 double precision floating-point operations. The results of these different execution units may be provided to a writeback unit 880. Note that in some implementations separate writeback units may be associated with each of the execution units. Furthermore, understand that while each of the units and logic shown in FIG. 8 is represented at a high level, a particular implementation may include more or different structures.

Note that in a processor having asymmetric cores, such as in accordance with the micro-architectures of FIGS. 7 and 8, workloads may be dynamically swapped for power management reasons, as these cores, although having different pipeline designs and depths, may be of the same or related ISA. Such dynamic core swapping may be performed in a manner transparent to a user application (and possibly kernel also).

Although not shown for ease of illustration in FIG. 8, in some embodiments, the core 800 may include the compressed domain threshold filter 110 shown in FIGS. 1A-1B, and/or the filtering accelerator 200 and/or processor engine 210 shown in FIGS. 2A-2C.

Figure 9:
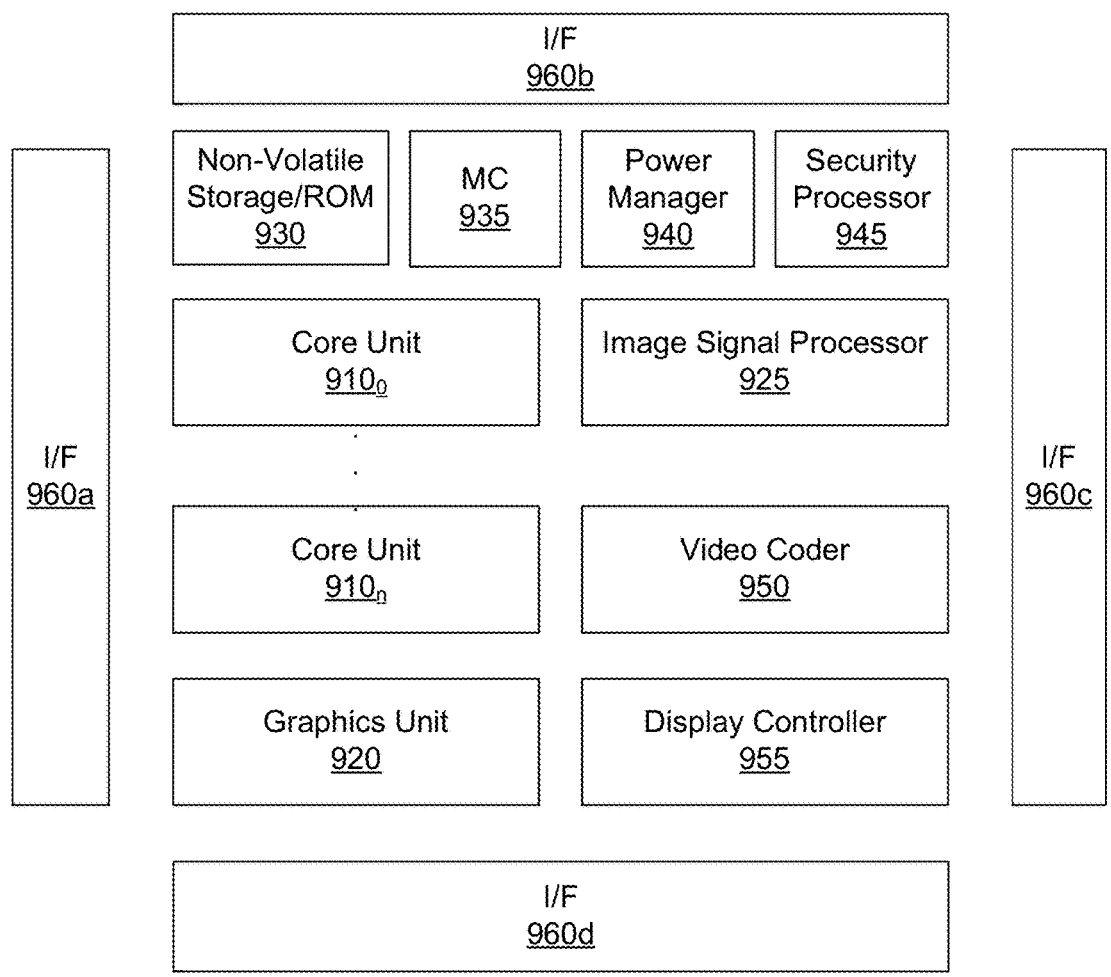
FIG. 9 is a block diagram of a processor in accordance with one or more embodiments.

A processor designed using one or more cores having pipelines as in any one or more of FIGS. 5-8 may be implemented in many different end products, extending from mobile devices to server systems. Referring now to FIG. 9, shown is a block diagram of a processor in accordance with another embodiment of the present invention. In the embodiment of FIG. 9, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device.

In the high level view shown in FIG. 9, processor 900 includes a plurality of core units $910_0$-$910_n$. Each core unit may include one or more processor cores, one or more cache memories and other circuitry. Each core unit 910 may support one or more instructions sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level (L2) cache memory. A non-volatile storage 930 may be used to store various program and other data. For example, this storage may be used to store at least portions of microcode, boot information such as a BIOS, other system software or so forth.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 9).

In addition to core units, additional processor engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 9, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth.

Each of the units may have its power consumption controlled via a power manager 940, which may include control logic to perform the various power management techniques described herein.

In some embodiments, SoC 900 may further include a non-coherent fabric coupled to the coherent fabric to which various peripheral devices may couple. One or more interfaces 960a-960d enable communication with one or more off-chip devices. Such communications may be according to a variety of communication protocols such as PCIe™, GPIO, USB, I²C, UART, MIN, SDIO, DDR, SPI, HDMI, among other types of communication protocols. Although shown at this high level in the embodiment of FIG. 9, understand the scope of the present invention is not limited in this regard.

Although not shown for ease of illustration in FIG. 9, in some embodiments, the SoC 900 may include the compressed domain threshold filter 110 shown in FIGS. 1A-1B, and/or the filtering accelerator 200 and/or processor engine 210 shown in FIGS. 2A-2C.

Figure 10:
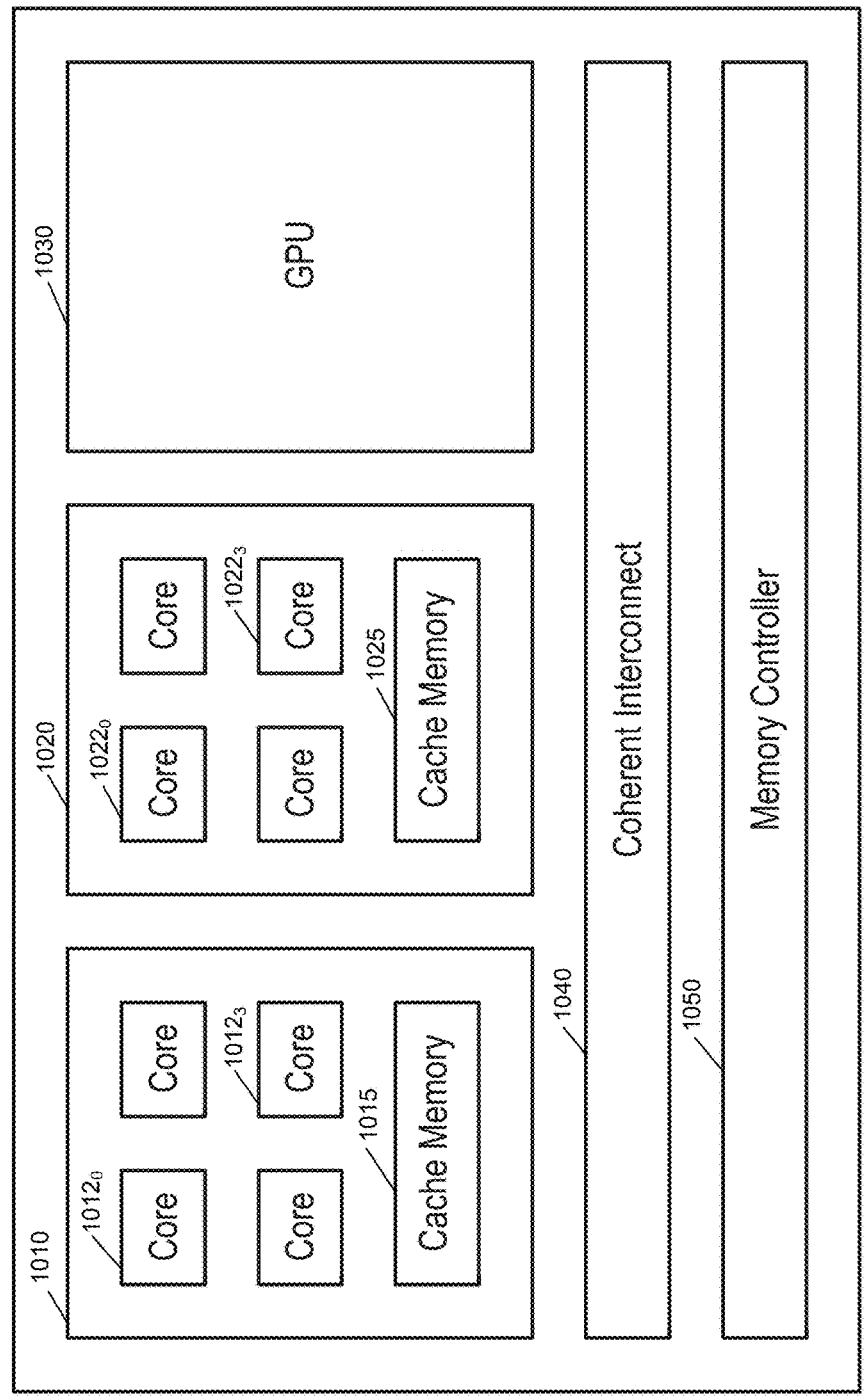
FIG. 10 is a block diagram of a representative SoC in accordance with one or more embodiments.

Referring now to FIG. 10, shown is a block diagram of a representative SoC. In the embodiment shown, SoC 1000 may be a multi-core SoC configured for low power operation to be optimized for incorporation into a smartphone or other low power device such as a tablet computer or other portable computing device. As an example, SoC 1000 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel and ARM cores may be implemented in a given SoC.

As seen in FIG. 10, SoC 1000 includes a first core domain 1010 having a plurality of first cores $1012_0$-$1012_3$. In an example, these cores may be low power cores such as in-order cores. In one embodiment these first cores may be implemented as ARM Cortex A53 cores. In turn, these cores couple to a cache memory 1015 of core domain 1010. In addition, SoC 1000 includes a second core domain 1020. In the illustration of FIG. 10, second core domain 1020 has a plurality of second cores $1022_0$-$1022_3$. In an example, these cores may be higher power-consuming cores than first cores 1012. In an embodiment, the second cores may be out-of-order cores, which may be implemented as ARM Cortex A57 cores. In turn, these cores couple to a cache memory 1025 of core domain 1020. Note that while the example shown in FIG. 10 includes 4 cores in each domain, understand that more or fewer cores may be present in a given domain in other examples.

With further reference to FIG. 10, a graphics domain 1030 also is provided, which may include one or more graphics processing units (GPUs) configured to independently execute graphics workloads, e.g., provided by one or more cores of core domains 1010 and 1020. As an example, GPU domain 1030 may be used to provide display support for a variety of screen sizes, in addition to providing graphics and display rendering operations.

As seen, the various domains couple to a coherent interconnect 1040, which in an embodiment may be a cache coherent interconnect fabric that in turn couples to an integrated memory controller 1050. Coherent interconnect 1040 may include a shared cache memory, such as an L3 cache, some examples. In an embodiment, memory controller 1050 may be a direct memory controller to provide for multiple channels of communication with an off-chip memory, such as multiple channels of a DRAM (not shown for ease of illustration in FIG. 10).

In different examples, the number of the core domains may vary. For example, for a low power SoC suitable for incorporation into a mobile computing device, a limited number of core domains such as shown in FIG. 10 may be present. Still further, in such low power SoCs, core domain 1020 including higher power cores may have fewer numbers of such cores. For example, in one implementation two cores 1022 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Although not shown for ease of illustration in FIG. 10, in some embodiments, the SoC 1000 may include the compressed domain threshold filter 110 shown in FIGS. 1A-1B, and/or the filtering accelerator 200 and/or processor engine 210 shown in FIGS. 2A-2C.

Figure 11:
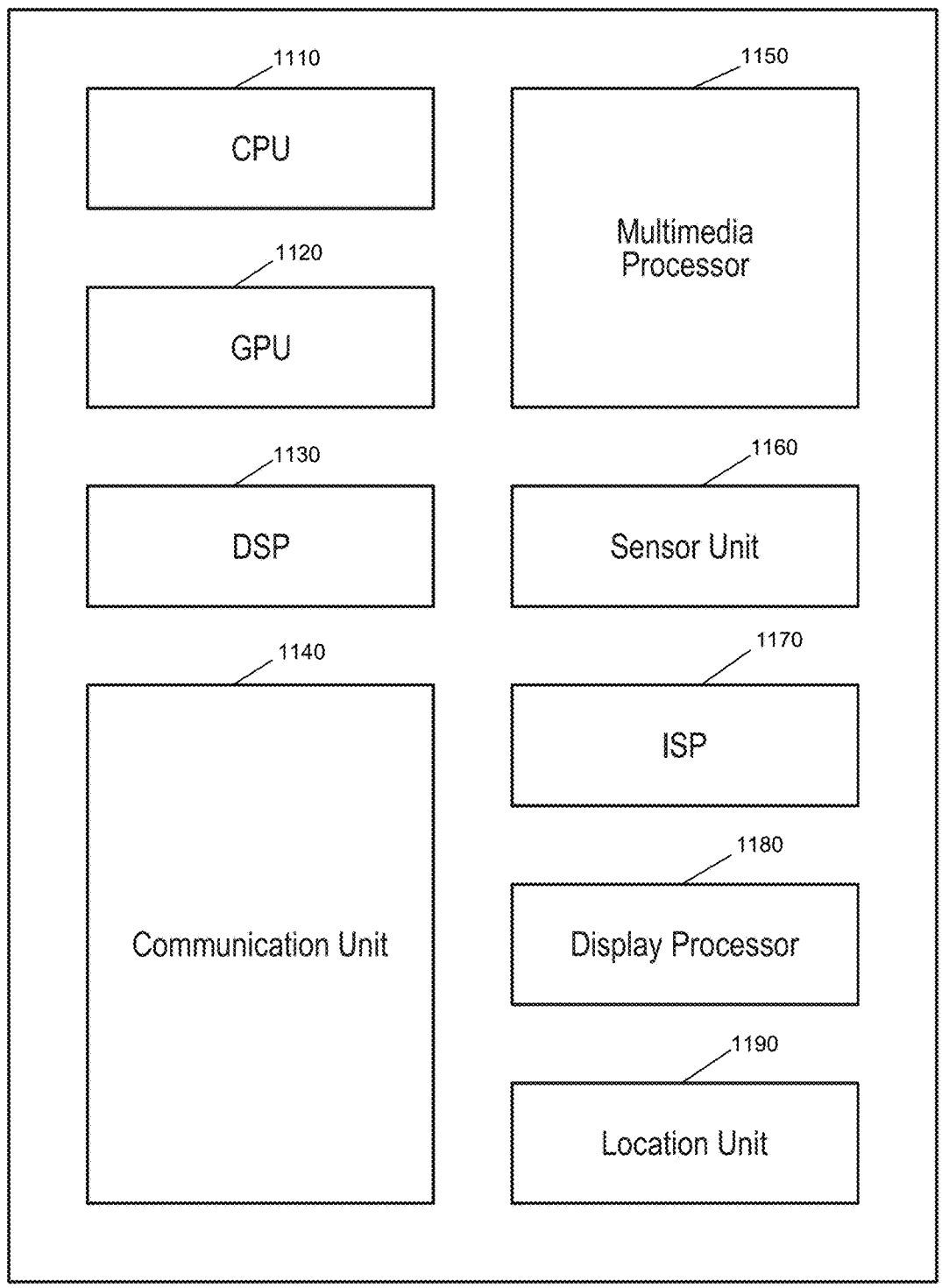
FIG. 11 is a block diagram of another example SoC in accordance with one or more embodiments.

Referring now to FIG. 11, shown is a block diagram of another example SoC. In the embodiment of FIG. 11, SoC 1100 may include various circuitry to enable high performance for multimedia applications, communications and other functions. As such, SoC 1100 is suitable for incorporation into a wide variety of portable and other devices, such as smartphones, tablet computers, smart TVs and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area techniques such as Bluetooth™, IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver. Understand that while shown with this particular set of components in the example of FIG. 11, many variations and alternatives are possible.

Although not shown for ease of illustration in FIG. 11, in some embodiments, the SoC 1100 may include the compressed domain threshold filter 110 shown in FIGS. 1A-1B, and/or the filtering accelerator 200 and/or processor engine 210 shown in FIGS. 2A-2C.

Figure 12:
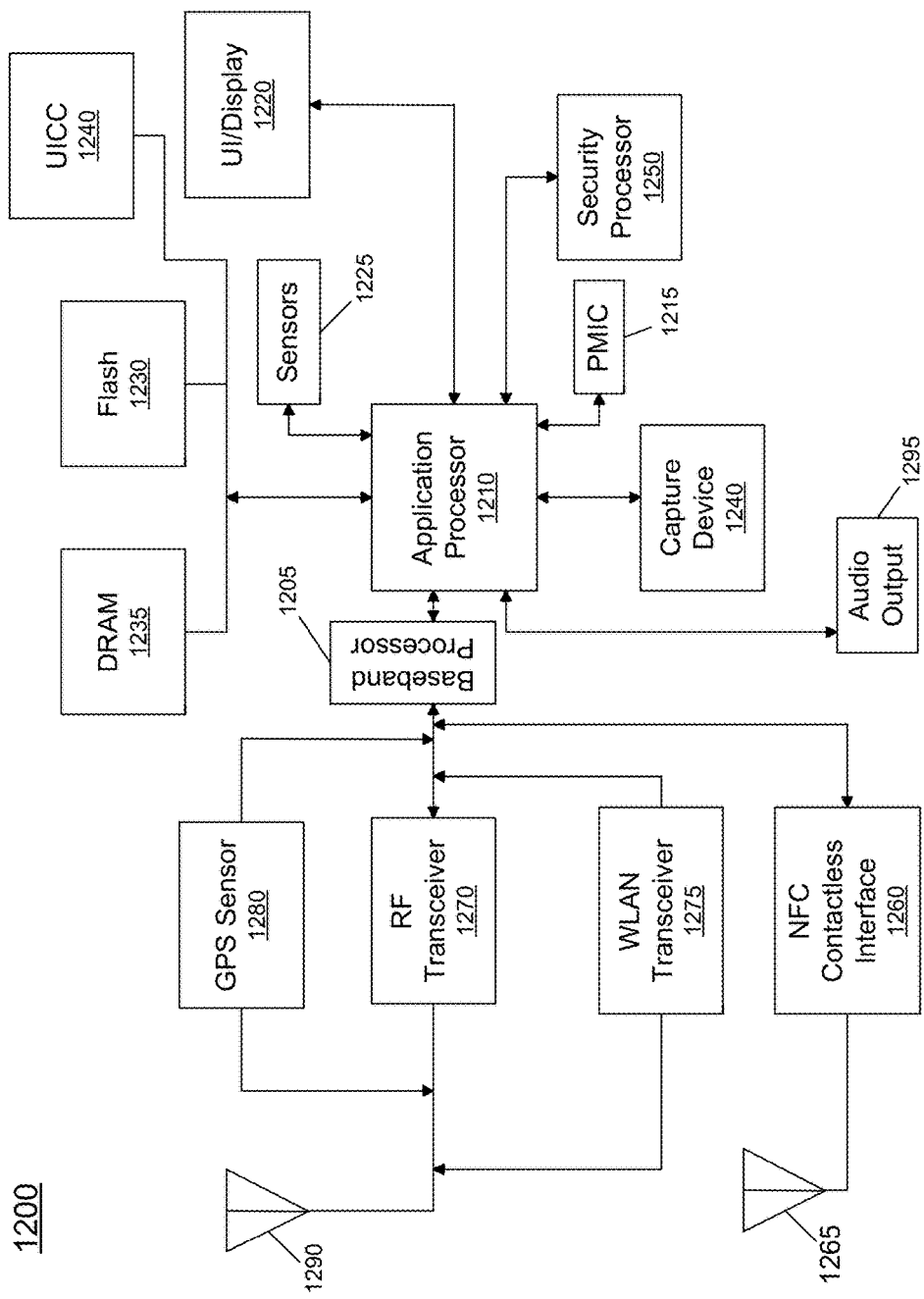
FIG. 12 is a block diagram of an example system with which one or more embodiments can be used.

Referring now to FIG. 12, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software, in addition to user applications such as many well-known social media and multimedia apps. Application processor 1210 may further be configured to perform a variety of other computing operations for the device.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 12, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 12, understand that in some implementations one antenna or a different set of antennae may be provided to enable various wireless functionality.

A power management integrated circuit (PMIC) 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications, such as according to a Bluetooth™ standard or an IEEE 802.11 standard such as IEEE 802.11a/b/g/n can also be realized.

Although not shown for ease of illustration in FIG. 12, in some embodiments, the system 1200 may include the compressed domain threshold filter 110 shown in FIGS. 1A-1B, and/or the filtering accelerator 200 and/or processor engine 210 shown in FIGS. 2A-2C.

Figure 13:
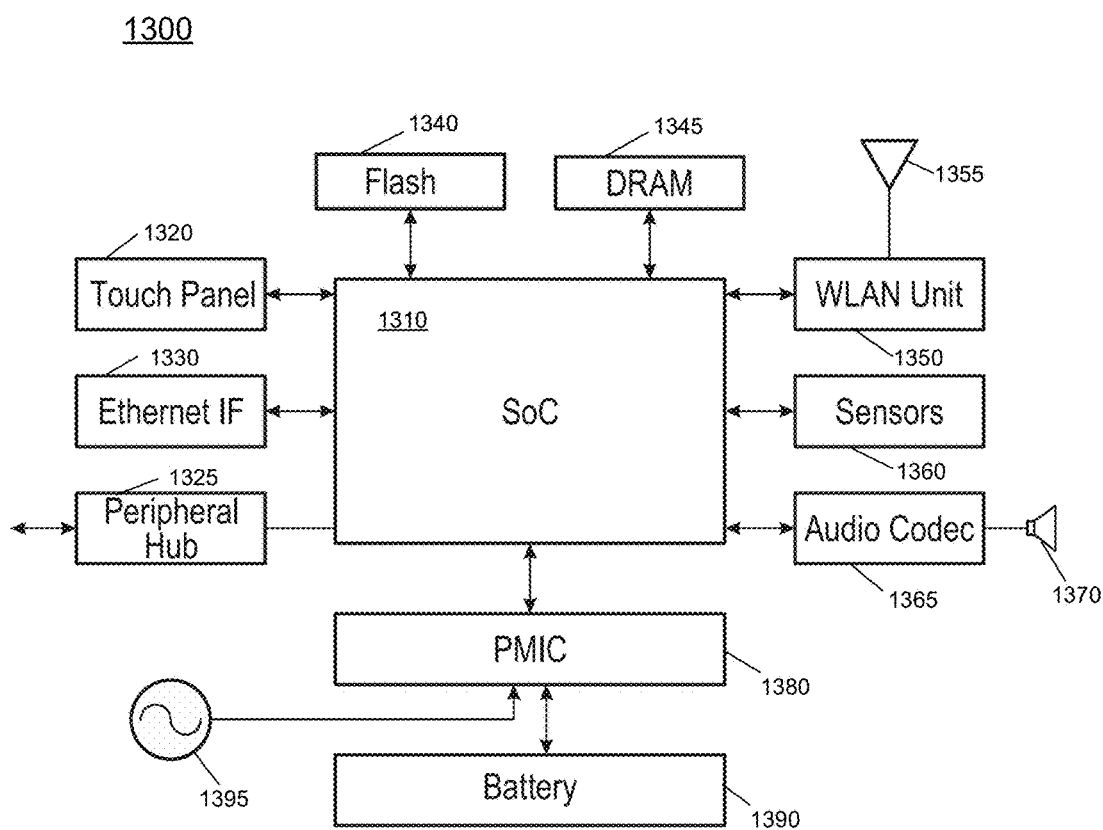
FIG. 13 is a block diagram of another example system with which one or more embodiments may be used.

Referring now to FIG. 13, shown is a block diagram of another example system with which embodiments may be used. In the illustration of FIG. 13, system 1300 may be mobile low-power system such as a tablet computer, 2:1 tablet, phablet or other convertible or standalone tablet system. As illustrated, a SoC 1310 is present and may be configured to operate as an application processor for the device.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 13, to provide for wireless capabilities, a WLAN unit 1350 is coupled to SoC 1310 and in turn to an antenna 1355. In various implementations, WLAN unit 1350 may provide for communication according to one or more wireless protocols, including an IEEE 802.11 protocol, a Bluetooth™ protocol or any other wireless protocol.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 13, many variations and alternatives are possible.

Although not shown for ease of illustration in FIG. 13, in some embodiments, the system 1300 may include the compressed domain threshold filter 110 shown in FIGS. 1A-1B, and/or the filtering accelerator 200 and/or processor engine 210 shown in FIGS. 2A-2C.

Figure 14:
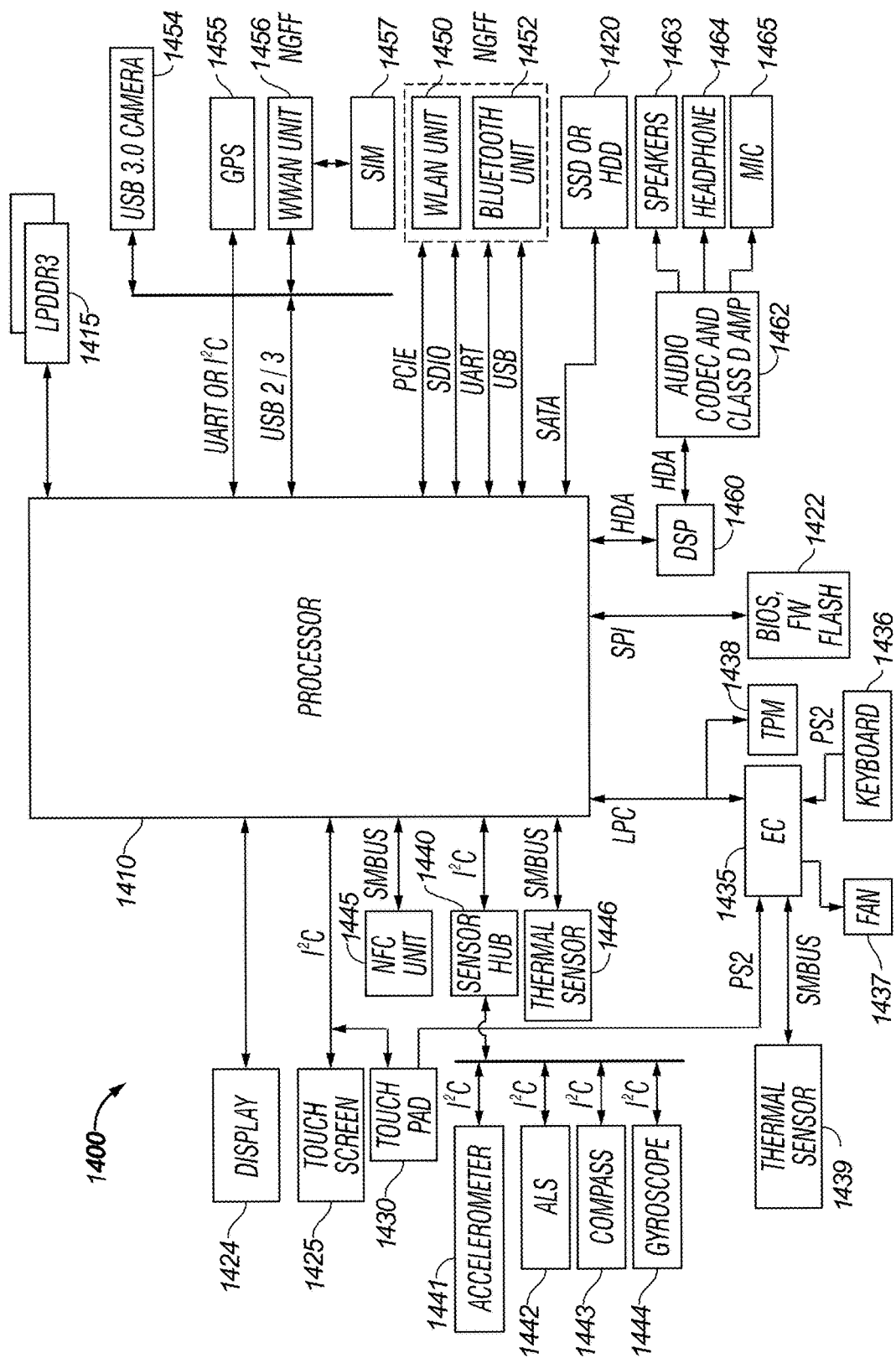
FIG. 14 is a block diagram of a computer system in accordance with one or more embodiments.

Referring now to FIG. 14, a block diagram of a representative computer system 1400 such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1410 is implemented as a SoC.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 14, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 14 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an $I^2C$ interconnect. As further shown in FIG. 14, in addition to touch screen 1425, user input by way of touch can also occur via a touch pad 1430 which may be configured within the chassis and may also be coupled to the same $I^2C$ interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an $I^2C$ interconnect. In the embodiment shown in FIG. 14, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 14, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 in accordance with the Trusted Computing Group (TCG) TPM Specification Version 1.2, dated Oct. 2, 2003, may also couple to processor 1410 via this LPC interconnect.

System 1400 can communicate with external devices in a variety of manners, including wirelessly. In the embodiment shown in FIG. 14, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 14, additional wireless units can include other short range wireless engines including a WLAN unit 1450 and a Bluetooth unit 1452. Using WLAN unit 1450, Wi-Fi™ communications in accordance with a given IEEE 802.11 standard can be realized, while via Bluetooth unit 1452, short range communications via a Bluetooth protocol can occur. These units may communicate with processor 1410 via, e.g., a USB link or a universal asynchronous receiver transmitter (UART) link. Or these units may couple to processor 1410 via an interconnect according to a PCIe™ protocol or another such protocol such as a serial data input/output (SDIO) standard.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 14, WWAN unit 1456 and an integrated capture device such as a camera module 1454 may communicate via a given USB protocol such as a USB 2.0 or 3.0 link, or a UART or I²C protocol.

An integrated camera module 1454 can be incorporated in the lid. To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 14, understand the scope of the present invention is not limited in this regard.

Although not shown for ease of illustration in FIG. 14, in some embodiments, the system 1400 may include the compressed domain threshold filter 110 shown in FIGS. 1A-1B, and/or the filtering accelerator 200 and/or processor engine 210 shown in FIGS. 2A-2C.

Figure 15:
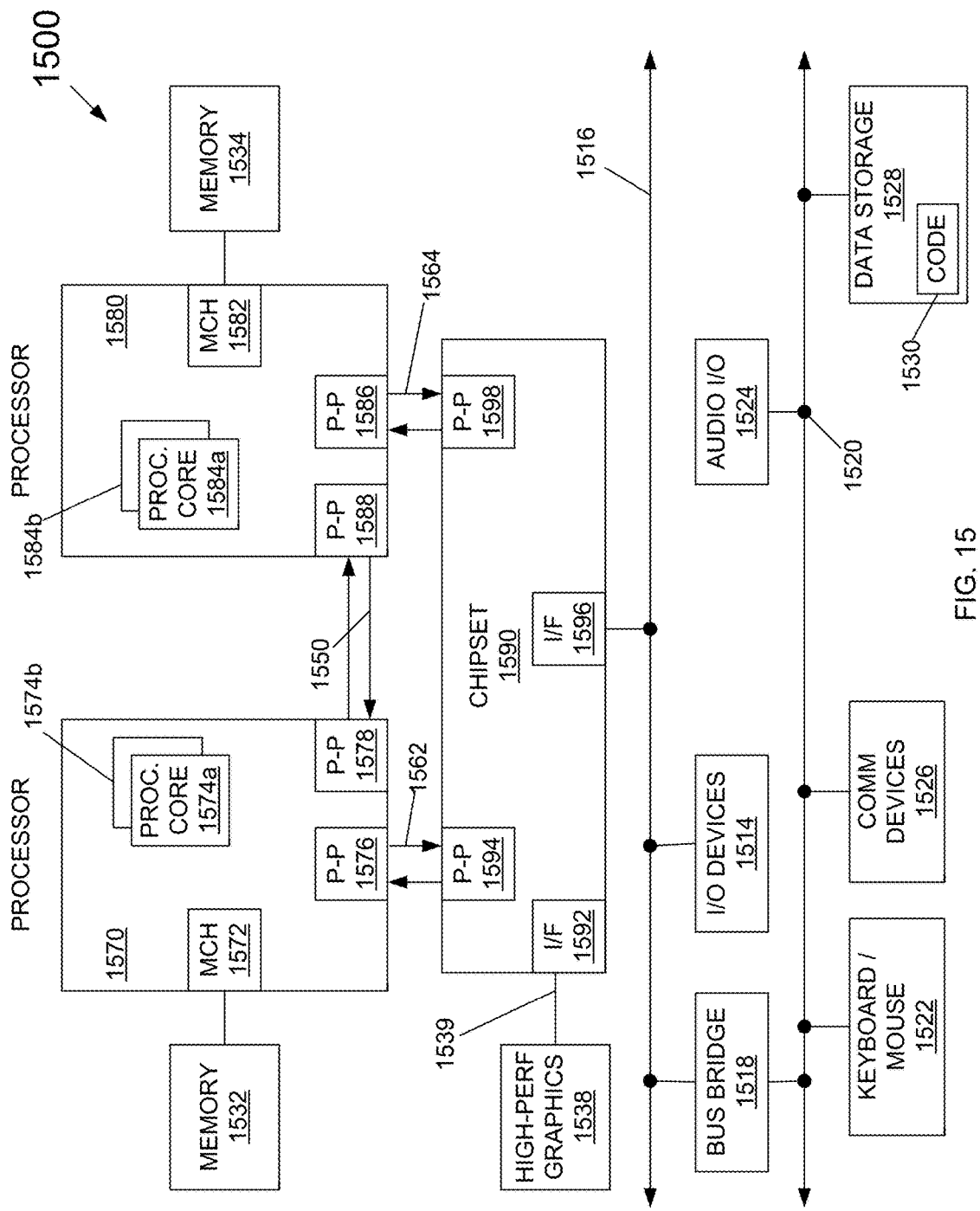
FIG. 15 is a block diagram of a system in accordance with one or more embodiments.

Embodiments may be implemented in many different system types. Referring now to FIG. 15, shown is a block diagram of a system in accordance with an embodiment of the present invention. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processor cores 1574a and 1574b and processor cores 1584a and 1584b), although potentially many more cores may be present in the processors. Each of the processors can include a PCU or other power management logic to perform processor-based power management as described herein.

Still referring to FIG. 15, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 15, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

Although not shown for ease of illustration in FIG. 15, in some embodiments, the system 1500 may include the compressed domain threshold filter 110 shown in FIGS. 1A-1B, and/or the filtering accelerator 200 and/or processor engine 210 shown in FIGS. 2A-2C.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

The following clauses and/or examples pertain to further embodiments.

In one example, a processor for performing compressed data filtering includes a plurality of cores, and a compression domain threshold filter coupled to the plurality of cores. The compression domain threshold filter is to: receive a sample vector of compressed data to be filtered; calculate, based at least on a first subset of the elements of the sample vector, an estimated upper bound value of a dot product of the sample vector and a steering vector; determine whether the estimated upper bound value of the dot product satisfies a filter threshold value; and in response to a determination that the estimated upper bound value of the dot product does not satisfy the filter threshold value, discard the sample vector without completion of a calculation of the dot product of the sample vector and the steering vector.

In an example, the compression domain threshold filter is further to: calculate a first portion of the dot product using the first subset of elements of the sample vector and a first subset of elements of the steering vector, wherein the first subset of elements of the steering vector is associated with the first subset of elements of the sample vector; and calculate the estimated upper bound value of the dot product using at least the first portion of the dot product. In an example, the compression domain threshold filter is further to: calculate a first product by multiplication of a maximum value of a remainder of the elements of the sample vector times a value of an element x of the steering vector, wherein the element x of the steering vector is a next element after the first subset of the elements of the steering vector; calculate a second product by multiplication of the first product times a total number of the remainder of the elements of the sample vector; and calculate the estimated upper bound value of the dot product by summation of the first portion of the dot product and the second product.

In an example, the compression domain threshold filter is further to, in response to a determination that the estimated upper bound value of the dot product satisfies the filter threshold value: evaluate a remainder of the elements of the sample vector; calculate the dot product based on the elements of the sample vector; and determine whether the dot product satisfies the filter threshold value.

In an example, the compression domain threshold filter is further to, in response to a determination that the estimated upper bound value of the dot product satisfies the filter threshold value: calculate, based on a second subset of the elements of the sample vector, a second estimated upper bound value of the dot product of the sample vector and the steering vector; and determine whether the second estimated upper bound value of the dot product satisfies the threshold value, where the first subset of the elements is included in the second subset of the elements.

In an example, the compression domain threshold filter is to calculate the estimated upper bound value in response to reaching a first checkpoint element of a number of checkpoint elements, wherein the number of checkpoint elements is based on the length of the sample vector.

In an example, the compression domain threshold filter is to switch between a steering vector sorting mode, a threshold filtering mode, and a covariance computation mode. In an example, when in the steering vector sorting mode, the compression domain threshold filter is to: receive the steering vector, wherein the steering vector is based on the compressed data; and sort each element of the steering vector in order of decreasing value.

In another example, a method for performing compressed data filtering includes: receiving, at a hardware accelerator of a processor, a sample vector including N elements of compressed data; iterating, by the hardware accelerator, through a first subset of elements of the sample vector to calculate a first portion of a dot product of the sample vector and a steering vector; calculating, by the hardware accelerator, an estimated upper bound value of the dot product using at least the first portion of the dot product; and in response to a determination that the estimated upper bound value of the dot product does not satisfy a filter threshold value, dropping the sample vector without completing a calculation of the dot product of the sample vector and the steering vector.

In an example, the first subset of elements of the sample vector includes elements 0 to M, and calculating the first portion of the dot product includes: for each element i from 0 to M, multiplying a value xi of the steering vector times a value yi of the sample vector to obtain a product Pi; and summing the products P0 to PM to obtain the first portion of the dot product.

In an example, the method also includes: calculating, by the hardware accelerator, a second portion of the dot product by multiplying a maximum value of a remainder of the elements of the sample vector times a value of element (M+1) of the steering vector times a total number of the remainder of the elements of the sample vector, wherein the remainder of the elements of the sample vector includes elements from (M+1) to N of the sample vector; and calculating, by the hardware accelerator, the estimated upper bound value of the dot product by summing the first portion of the dot product and the second portion of the dot product.

In an example, the method also includes: in response to a determination that the estimated upper bound value of the dot product satisfies the filter threshold value, continuing an evaluation of the remainder of the elements of the sample vector.

In an example, the method also includes, in response to a determination that an update to the steering vector is required: calculating a covariance matrix based on the compressed data; calculating the steering vector based on the covariance matrix; and sorting, by the hardware accelerator, each element of the steering vector in order of decreasing value.

In an example, calculating the estimated upper bound value of the dot product is performed in response to reaching a first checkpoint element of a number of checkpoint elements.

In another example, a machine readable medium has stored thereon data, which if used by at least one machine, causes the at least one machine to fabricate at least one integrated circuit to perform the method of any of the above examples.

In another example, an apparatus for processing instructions is configured to perform the method of any of the above examples.

In another example, a system comprises a hardware accelerator including a plurality of processor engines, and at least one core to execute at least one application. Each processor engine is to iterate through elements of a sample vector of compressed data to perform calculations for a dot product of the sample vector and a steering vector. Each processor engine is also to, in response to reaching an element specified as a checkpoint in the sample vector: calculate, using at least a first subset of the elements of the sample vector, an estimated upper bound for the dot product; determine whether the estimated upper bound of the dot product satisfies a filter threshold value; in response to a determination that the upper bound value of the dot product satisfies the filter threshold value, iterate through at least some remaining elements of the sample vector; and in response to a determination that the upper bound value of the dot product does not satisfy the filter threshold value, filter the sample vector. The at least one application may use the sample vector when the sample vector is not filtered by the hardware accelerator.

In an example, the hardware accelerator is to switch between at least two of a steering vector sorting mode, a threshold filtering mode, and a covariance computation mode.

In an example, the plurality of processor engines are connected in series from a first processor engine to a last processor engine, and when in the steering vector sorting mode: elements of the steering vector are individually provided to the first processor engine; and the elements of the steering vector are linearly sorted from the first processor engine to the last processor engine.

In an example, when in the covariance computation mode, the plurality of processor engines perform a sequential calculation on the compressed data from the first processor engine to the last processor engine to generate a covariance matrix.

In an example, when in the threshold filtering mode, each processor engine of the plurality of processor engines is to process one sample vector of compressed data in parallel.

In an example, when in the threshold filtering mode, each processor engine of the plurality of processor engines is to use the steering vector.

In an example, the at least one application is to, in response to a determination that an update to the steering vector is required: update the steering vector based on a covariance matrix.

In an example, the at least one application is to, in response to a determination that a rejection rate of the hardware accelerator is outside an acceptable range, adjust the filter threshold level.

In an example, the checkpoint element of the sample vector is one of a number of checkpoint elements of the sample vector, where the number of checkpoint elements is based on the length of the sample vector.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
receiving, at a hardware accelerator of a processor, a sample vector comprising a plurality of data elements;
initiating, by the hardware accelerator, an iterative calculation of a second value using all of the plurality of data elements of the sample vector;
in response to reaching a first checkpoint element of the sample vector, calculating, by the hardware accelerator, a first value using a first subset of the plurality of data elements of the sample vector, wherein the first value is an estimated result of the iterative calculation if completed using all of the plurality of data elements of the sample vector;
determining, by the hardware accelerator, whether the first value satisfies a filter threshold value; and
in response to a determination that the first value does not satisfy the filter threshold value, discarding the sample vector without completion of the iterative calculation of the second value using all of the plurality of data elements of the sample vector,
wherein the first checkpoint element is one of a plurality of checkpoint elements included in the sample vector, wherein the plurality of checkpoint elements is a subset of the plurality of data elements of the sample vector, wherein the hardware accelerator is to not calculate the first value for a set of data elements prior to reaching the first checkpoint element.

2. The method of claim 1, wherein the iterative calculation calculates a dot product of the sample vector and a steering vector.

3. The method of claim 2, wherein each iteration of the iterative calculation comprises multiplying one element of the sample vector and one element of the steering vector.

4. The method of claim 2, further comprising updating the steering vector based on a covariance matrix.

5. A processor comprising:
a plurality of processing elements; and
circuitry to:
receive a sample vector to be filtered, the sample vector comprising a plurality of data elements;
initiate an iterative calculation of a second value using all of the plurality of data elements of the sample vector;
prior to completion of the iterative calculation of the second value, in response to reaching a first checkpoint element of the sample vector, calculate a first value using a first subset of the plurality of data elements of the sample vector, wherein the first value is an estimated result of the iterative calculation if completed using all of the plurality of data elements of the sample vector;
determine whether the first value satisfies a filter threshold value; and
in response to a determination that the first value does not satisfy the filter threshold value, discard the sample vector without completion of the iterative calculation of the second value using all of the plurality of data elements of the sample vector,
wherein the first checkpoint element is one of a plurality of checkpoint elements included in the sample vector, wherein the plurality of checkpoint elements is a subset of the plurality of data elements of the sample vector, wherein the circuitry is to not calculate the first value for a set of data elements prior to reaching the first checkpoint element.

6. The processor of claim 5, wherein each of the plurality of data elements comprises compressed data.

7. The processor of claim 5, wherein the iterative calculation calculates a dot product of the sample vector and a steering vector.

8. The processor of claim 7, wherein each iteration of the iterative calculation comprises multiplying one element of the sample vector and one element of the steering vector.

9. The processor of claim 5, wherein the circuitry is further to:
in response to a determination that the first value satisfies the filter threshold value, continuing the iterative calculation of the second value using at least some of the plurality of data elements.

10. A processor comprising:
a plurality of processing elements; and
logic to:
iterate through a plurality of data elements of a sample vector to perform a vector calculation comprising a plurality of iterative calculations;
upon reaching a data element specified as a first checkpoint element in the sample vector, calculate a first value using a first subset of the plurality of iterative calculations, wherein the first value is an estimated result of the vector calculation upon completion of the plurality of iterative calculations, wherein the sample vector comprises a plurality of checkpoint elements, wherein the plurality of checkpoint elements is a subset of the plurality of data elements of the sample vector, wherein the logic is to not calculate the first value for a set of data elements prior to reaching the first checkpoint element;
determine whether the first value satisfies a filter threshold value; and
continue to iterate through the plurality of data elements only upon a determination that the first value satisfies the filter threshold value.

11. The processor of claim 10, wherein the vector calculation calculates a dot product of the sample vector and a steering vector.

12. The processor of claim 11, wherein each iteration of the iterative calculation comprises multiplying one element of the sample vector and one element of the steering vector.

13. The processor of claim 11, wherein the circuitry is further to update the steering vector using a covariance matrix.

14. The processor of claim 10, wherein the logic is further to:
in response to a determination that the first value does not satisfy the filter threshold value, discard the sample vector without completion of the plurality of the iterative calculations.

* * * * *